United States Patent
Silverstein et al.

(10) Patent No.: US 11,977,258 B1
(45) Date of Patent: May 7, 2024

(54) STRUCTURE WITH SUBSTRATE-EMBEDDED ARROW WAVEGUIDE AND METHOD

(71) Applicant: GlobalFoundries U.S. Inc., Malta, NY (US)

(72) Inventors: Laura J. Silverstein, Richmond, VT (US); Steven M. Shank, Jericho, VT (US); Judson R. Holt, Ballston Lake, NY (US); Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 0 days.

(21) Appl. No.: 18/148,029

(22) Filed: Dec. 29, 2022

(51) Int. Cl.
  *G02B 6/122* (2006.01)
  *G02B 6/13* (2006.01)
  *G02B 6/02* (2006.01)
  *G02B 6/12* (2006.01)

(52) U.S. Cl.
  CPC .............. *G02B 6/122* (2013.01); *G02B 6/13* (2013.01); *G02B 6/02042* (2013.01); *G02B 6/02333* (2013.01); *G02B 2006/121* (2013.01)

(58) Field of Classification Search
  CPC .. G02B 6/02042; G02B 6/02333; G02B 6/12; G02B 6/13; G02B 2006/121
  See application file for complete search history.

(56) References Cited

U.S. PATENT DOCUMENTS

| | | | | |
|---|---|---|---|---|
| 4,715,672 A | * | 12/1987 | Duguay | G02B 6/122 385/129 |
| 5,271,801 A | * | 12/1993 | Valette | G02B 6/136 216/24 |
| 5,281,305 A | * | 1/1994 | Lee | G02B 6/12002 216/24 |

(Continued)

FOREIGN PATENT DOCUMENTS

| JP | 10-133047 A | * | 5/1998 |
| JP | 4095358 B2 | * | 6/2008 |

OTHER PUBLICATIONS

S. Campopiano et al. Microfluidic sensor based on integrated optical hollow waveguides. Optics Letters, 29:16:1894-1896, Aug. 15, 2004. (https://doi.org/10.1364/OL.29.001894) (Year: 2004).*

(Continued)

*Primary Examiner* — Michael Stahl
(74) *Attorney, Agent, or Firm* — Anthony Canale; Hoffman Warnick LLC

(57) ABSTRACT

Disclosed are a structure with a substrate-embedded waveguide and a method of forming the structure. The waveguide includes cladding material lining a trench in a substrate, a core in the trench on the cladding material, and at least one cavity within the core. Each cavity extends from one end of the core toward the opposite end and contains a low refractive index material or is under vacuum so the waveguide is an arrow waveguide. An insulator layer is on the substrate and extends laterally over the waveguide and a semiconductor layer is on the insulator layer. Additionally, depend- (Continued)

ing upon the embodiment, an additional waveguide can be aligned above the substrate-embedded waveguide either on the isolation region or on a waveguide extender that extends at least partially through the isolation region and the insulator layer to the waveguide.

20 Claims, 20 Drawing Sheets

(56) References Cited

U.S. PATENT DOCUMENTS

| | | | | |
|---|---|---|---|---|
| 5,943,463 | A * | 8/1999 | Unuma | H04N 1/486 385/119 |
| 5,987,196 | A * | 11/1999 | Noble | H01L 31/02325 257/E27.128 |
| 6,807,353 | B1 * | 10/2004 | Fleming | B82Y 20/00 385/132 |
| 7,388,278 | B2 | 6/2008 | Holt et al. | |
| 8,437,585 | B2 | 5/2013 | Na | |
| 8,883,080 | B2 * | 11/2014 | Packirisamy | B82Y 20/00 385/12 |
| 9,450,381 | B1 | 9/2016 | Cai et al. | |
| 10,078,183 | B2 | 9/2018 | Adderly et al. | |
| 10,502,896 | B2 | 12/2019 | Meade | |
| 11,262,500 | B2 | 3/2022 | Iida et al. | |
| 2001/0045613 | A1 * | 11/2001 | Nagata | H01L 21/306 257/510 |
| 2003/0103712 | A1 * | 6/2003 | Glebov | G02B 6/12004 385/14 |
| 2004/0252957 | A1 * | 12/2004 | Schmidt | G01N 21/645 385/131 |
| 2007/0058916 | A1 * | 3/2007 | Lo | G02B 6/1225 385/131 |
| 2009/0245718 | A1 * | 10/2009 | Li | G01N 21/31 385/12 |
| 2009/0294814 | A1 | 12/2009 | Assefa et al. | |
| 2012/0138568 | A1 | 6/2012 | Na | |
| 2013/0277795 | A1 | 10/2013 | Assefa et al. | |
| 2014/0140655 | A1 * | 5/2014 | Chakravarty | G01N 21/7746 385/12 |
| 2019/0377133 | A1 | 12/2019 | Meade | |
| 2020/0081184 | A1 | 3/2020 | Orcutt et al. | |
| 2021/0271023 | A1 | 9/2021 | Chang et al. | |

OTHER PUBLICATIONS

Aboketaf et al., "Towards fully automated testing and characterization for photonic compact modeling on 300-mm wafer platform," 2021 Optical Fiber Communications Conference and Exhibition (OFC), 2021, 3 pages.
Bian et al., "3D Integrated Laser Attach Technology on 300-mm Monolithic Silicon Photonics Platform," 2020 IEEE Photonics Conference (IPC), 2020, 2 pages.
Bian et al., "3D silicon photonic interconnects and integrated circuits based on phase matching," 2021 IEEE 71st Electronic Components and Technology Conference (ECTC), 2021, pp. 2279-2284.
Bian et al., "Hybrid III-V laser integration on a monolithic silicon photonic platform," Optical Fiber Communication Conference (OFC) (Optica Publishing Group, 2021), 3 pages.
Bian et al. "Light manipulation in a monolithic silicon photonics platform leveraging 3D coupling and decoupling." Frontiers in Optics. Optica Publishing Group, 2020, 2 pages.
Bian et al., "Monolithically integrated silicon nitride platform," 2021 Optical Fiber Communications Conference and Exhibition (OFC), 2021, 3 pages.
Bian et al., "Towards low-loss monolithic silicon and nitride photonic building blocks in state-of-the-art 300mm CMOS foundry," Frontiers in Optics/Laser Science OSA Technical Digest (Optica Publishing Group, 2020), 2 pages.
Chatterjee et al., "High-Speed Waveguide Integrated Silicon Photodetector on SiN-SOI Platform for Short Reach Datacom," Optics Letters, vol. 44, Issue 7m 2019, pp. 1-5.
Feng et al., "High Speed Ge Photodetector Monolithically Integrated with Large Cross-Section Silicon-on-Insulator Waveguide," Applied Physics Letters, vol. 95, 261105, 2009, pp. 1-4.
Gao et al., "High-Performance Chemical Vapor Deposited Graphene-on-Silicon Nitride Waveguide Photodetectors," Optics Letters, vol. 43, No. 6, 2018, pp. 1399-1402.
Giewont et al., "300-mm Monolithic Silicon Photonics Foundry Technology," IEEE Journal of Selected Topics in Quantum Electronics, Sep./Oct. 2019, vol. 25, No. 5., 12 pages.
Kohlstedt et al., "Two-Dimensional X-Ray Waveguides: Fabrication by Wafer-Bonding Process and Characterization," Applied Physics A, Materials Science & Processing, vol. 91, 2008 pp. 7-12.
Lousteau et al., "The Single-Mode Condition for Silicon-on-Insulator Optical Rib Waveguides With Large Cross Section," IEEE, Journal of Lightwave Technology, vol. 22, No. 8, 2004, pp. 1923-1929.
Peng et al., "A CMOS Compatible Monolithic Fiber Attach Solution with Reliable Performance and Self-alignment," 2020 Optical Fiber Communications Conference and Exhibition (OFC), 2020, 3 pages. v.
Rakowski et al., "45nm CMOS—Silicon Photonics Monolithic Technology (45CLO) for next-generation, low power and high speed optical interconnects," 2020 Optical Fiber Communications Conference and Exhibition (OFC), 2020, 3 pages.
Soref et al., "Large Single-Mode Rib Waveguides in GeSi—Si and Si-on-SiO2," IEEE Journal of Quantum Electronics, vol. 27, No. 8, 1991, pp. 1971-1974.
Soref et al., "Vertically Integrated Silicon-on-Insulator Waveguides," IEEE Photonics Technology Letters, vol. 3, No. 1, 1991, pp. 22-24.
Splett et al., "Low Loss Single-Mode Optical Waveguides with Large Cross-Section in Standard Epitaxial Silicon," EEE Photonics Technology Letters, vol. 6, No. 3, 1994, pp. 425-427.
Wilmart et al., "A Versatile Silicon-Silicon Nitride Photonics Platform for Enhanced Functionalities and Applications," Applied Sciences, vol. 9, 255, 2019, pp. 1-16.
Yanikgonul et al., "Simulation of Silicon Waveguide Single-Photon Avalanche Detectors for Integrated Quantum Photonics," IEEE Journal of Selected Topics in Quantum Electronics, 2019, pp. 1-9.
U.S. Appl. No. 17/131,997, Office Action dated Apr. 5, 2022, 7 pages.
U.S. Appl. No. 17/131,997, Notice of Allowance dated Jun. 15, 2022, 9 pages.
Uain et al., "The Hollow Core Light cage: Trapping Light Behind Bars," ACS Photonics, vol. 6, Published Dec. 31, 2018 on https://doi.org/10.1021.acsphotonics.8b01428, pp. 649-658.
Yin et al., "Planar optofluidic chip for single particle detection, manipulation, and analysis," The Royal Society of Chemistry, Lap on a Chip 7.9, 2007, pp. 1171-1175.
Yin et al., "Optical characterization of arch-shaped ARROW waveguides with liquid cores," Optics Express, vol. 13, No. 26, pp. 10564-10570.
Anonymous et al., "Integrated Manipulation and Analysis of Single Molecules on a Chip," Applied Optics Group, retrieved from https://photon.soe.ucsc.edu/iof.htm on Dec. 20, 2022, 11 pages.
Anonymous et al., "Modes of an ARROW Waveguide," Photon Design: Your Source of photonics CAD tools 2021, retrieved from https://www.photond.com/products/fimmwave/fimmwave_applications_06.htm on Dec. 20, 2022, 3 pages.

* cited by examiner

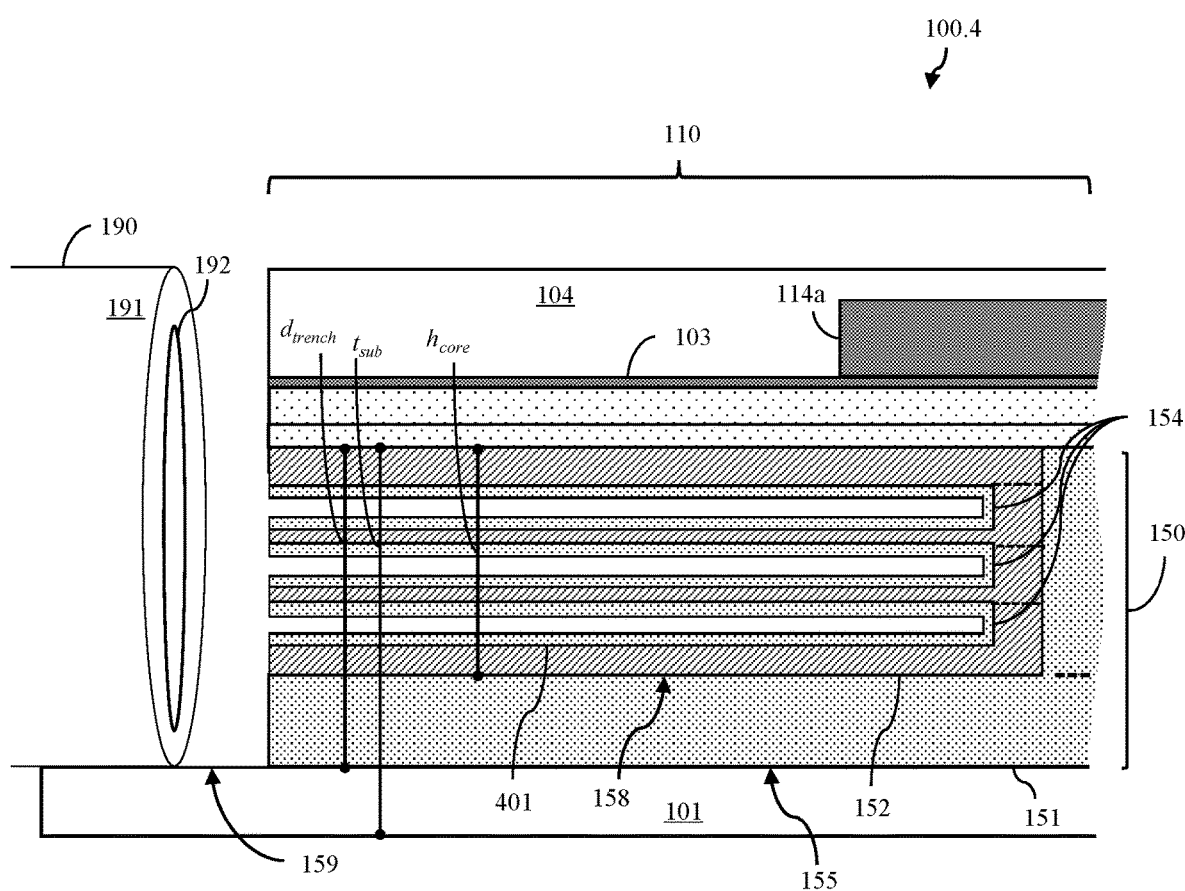
FIG. 4.1

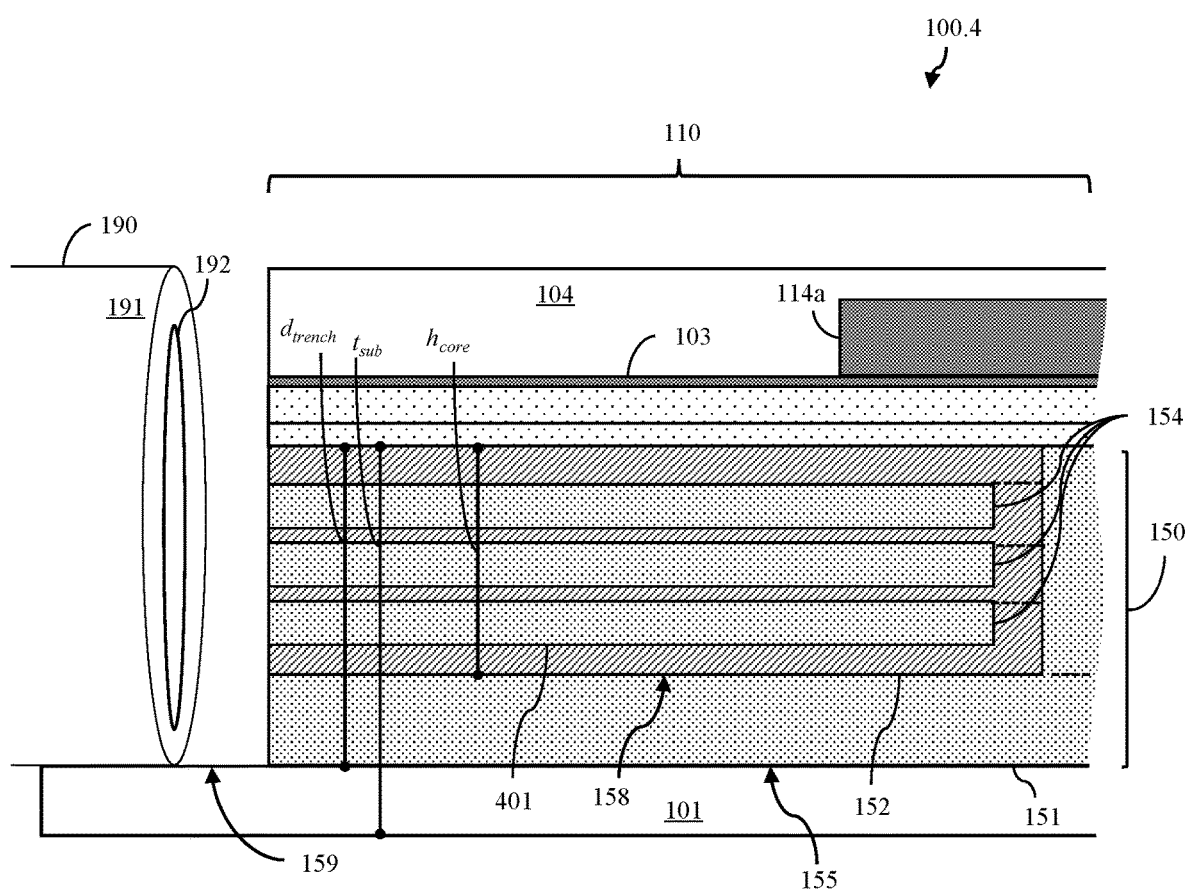
FIG. 4.2

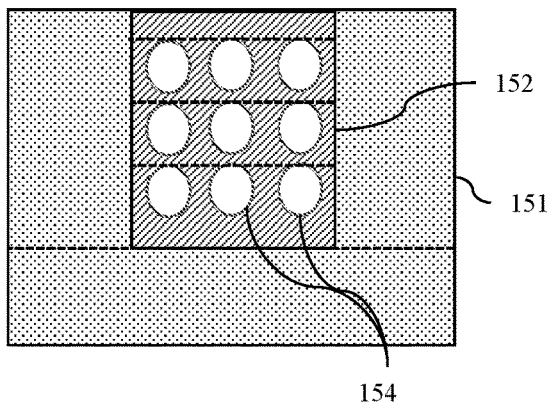
FIG. 6.1
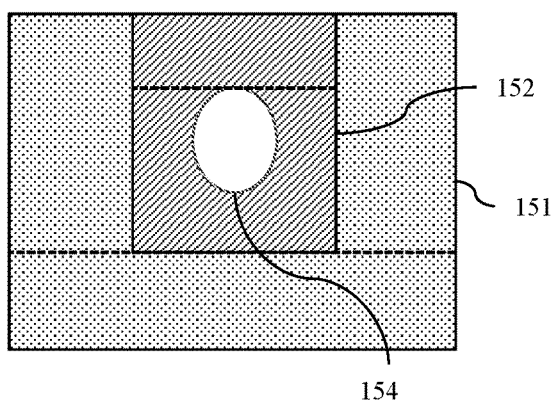
FIG. 6.2
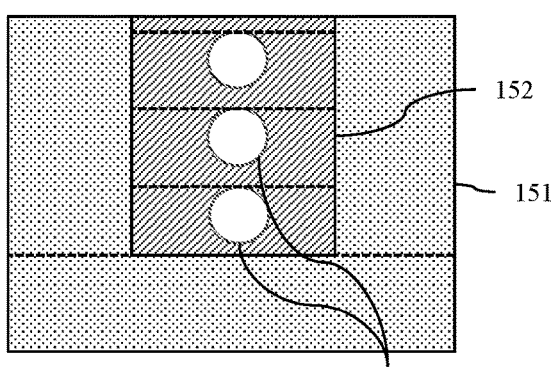
FIG. 6.3
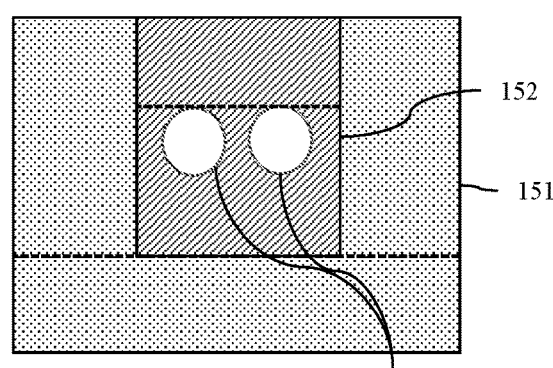
FIG. 6.4
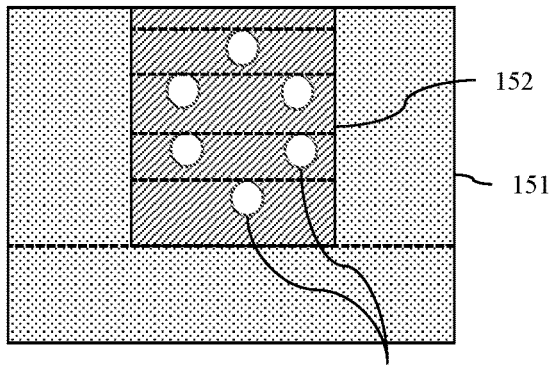
FIG. 6.5
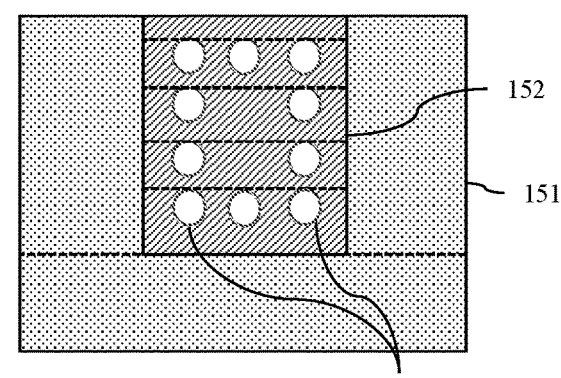
FIG. 6.6
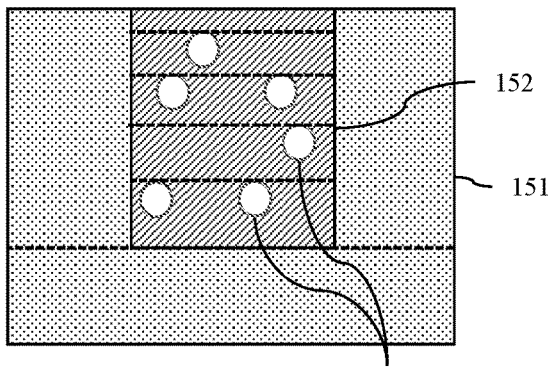
FIG. 6.7

US 11,977,258 B1

STRUCTURE WITH SUBSTRATE-EMBEDDED ARROW WAVEGUIDE AND METHOD

BACKGROUND

The present disclosure relates to integrated circuits (ICs) and, more particularly, to embodiments of a chip structure with at least one optical waveguide and to embodiments of a method of forming the chip structure.

Integrated circuit (IC) chips may be designed to incorporate a combination of both optical devices and electronic devices. Such chips can be either bulk semiconductor (e.g., bulk silicon) chip structures or semiconductor-on-insulator (e.g., silicon-on-insulator (SOI)) chip structures. Advantages associated with SOI chip structures include, but are not limited to, improved isolation, improved radiation tolerance, and reduced parasitic capacitance. However, integration of both optical and electronic devices on the same SOI chip can be difficult.

SUMMARY

Generally, disclosed herein are embodiments of a structure with a substrate-embedded waveguide. Specifically, the structure can include a semiconductor substrate. The structure can further include a waveguide within a trench in the semiconductor substrate. This waveguide can include cladding material lining the trench, a core within the trench on the cladding material, and at least one cavity within the core.

Some embodiments of the structure disclosed herein can include a semiconductor substrate and, as mentioned above, a waveguide within a trench in the semiconductor substrate The waveguide can include cladding material lining the trench, a core within the trench on the cladding material, and at least one cavity within the core. The structure can further include an insulator layer on the semiconductor substrate and extending laterally over the waveguide and a semiconductor layer on the insulator layer. An isolation region can further extend through the semiconductor layer to the insulator layer and can be aligned above the waveguide. Additionally, the structure can include a waveguide extender, which extends at least partially through the isolation region and the insulator layer toward the waveguide, and an additional waveguide on the waveguide extender.

Also disclosed herein are embodiments of a method for forming such structures. For example, the method can include providing a semiconductor substrate, forming a trench in the semiconductor substrate, and forming a waveguide in the trench. The waveguide can specifically be formed so that it includes cladding material lining the trench, a core within the trench on the cladding material, and at least one cavity within the core.

BRIEF DESCRIPTION OF THE SEVERAL VIEWS OF THE DRAWINGS

The present disclosure will be better understood from the following detailed description with reference to the drawings, which are not necessarily drawn to scale and in which:

FIGS. 4.1 and 4.2 are cross-section diagrams illustrating alternative embodiments, respectively, of a structure;

FIGS. 6.1-6.7 are diagrams illustrating various cavity patterns that could be employed in the disclosed structure embodiments;

DETAILED DESCRIPTION

As mentioned above, advantages associated with SOI chip structures include, but are not limited to, improved isolation, improved radiation tolerance, and reduced parasitic capacitance. A disadvantage associated with SOI chip structures relates to the integration of both optical devices and electronic devices into the same SOI chip structure. Specifically, in SOI chip structures with both optical devices and electronic devices, the maximum dimensions of the core of an optical waveguide can be limited by other CDs.

Figure 25:
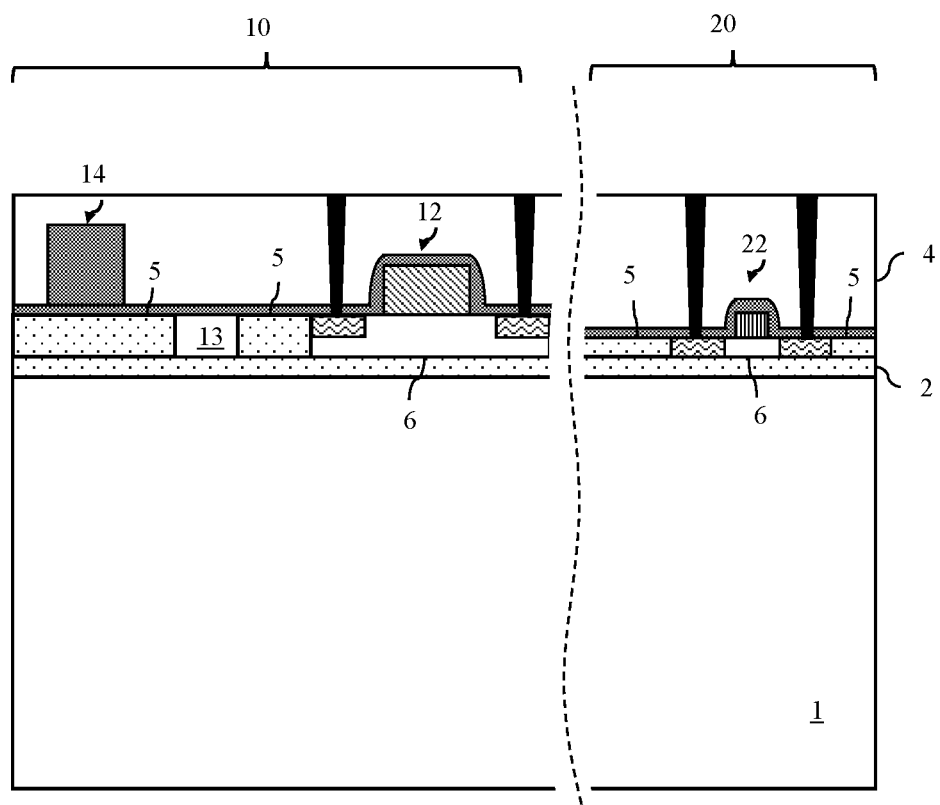
FIG. 25 is a cross-section diagram illustrative of an SOI chip structure.

For example, FIG. 25 is a cross-section diagram illustrative of an SOI chip structure. This SOI chip structure includes: a substrate 1 (e.g., a silicon (Si) substrate); an insulator layer 2 (e.g., a buried oxide (BOX) layer) on the substrate 1; and a Si layer 6 on the insulator layer 2. The SOI chip structure includes multiple devices areas including an optical device area 10 and an electronic device area 20. Optionally, the Si layer 6 can be relatively thick in the optical device area 10 and relatively thin in the electronic device area 20. For example, during processing, the optical device area 10 could be masked and the Si layer in the electronic device area 20 could be recessed. Alternatively, during processing, the electronic device area 20 could be masked, and additional Si can be epitaxially grown in the optical device area 10. The optical device area 10 can include one or more optical devices above the insulator layer 2. Such optical device(s) can include, but are not limited to, any of the following: one or more Si waveguides 13 (where each Si waveguide has a Si core patterned from the Si layer 6), one or more silicon nitride (SiN) waveguides 14 (where each SiN waveguide has a SiN core above a shallow trench isolation (STI) region 5 and, thereby above the level of the Si waveguides(s) 13), one or more photodetectors 12 (where each photodetector 12 has components both in and above the Si layer 6), one or more optical modulators, etc. The electronic device area 20 can include one or more electronic devices. Such electronic devices(s) can include, but are not limited to, any of the following: complementary metal oxide semiconductor (CMOS) devices (e.g., one or more field effect transistors (FETs) 22) and various other electronic devices (e.g., active or passive semiconductor devices, etc.). The optical and electronic devices can be covered by inter-layer dielectric (ILD) material 4. Middle of the line (MOL) contacts can extend vertically through the ILD material 4 to the one or more of the optical and/or electronic devices, as needed. In such an SOI chip structure, the maximum height of the Si core of the Si waveguide 13 is limited by a CD associated with the Si layer 6 and, particularly, by the maximum height of the Si layer 6. Additionally, the maximum height of the SiN core of the SiN waveguide 14 is limited, at least in part, by a CD associated with the MOL contacts and, particularly, the maximum allowable height of a MOL contact, which is set to minimize contact resistance. Since the MOL contacts extend through the ILD material 4 and have a maximum height and since the SiN core is embedded within the ILD material 4, the maximum height of a SiN core can be no more than the maximum height of the MOL contacts.

Unfortunately, since the core dimensions of an optical waveguide determine the properties of the optical waveguide, including the cut-off wavelength (i.e., the maximum wavelength of any optical signals that can be propagated by the waveguide), any limitations on the core dimensions also impact functionality.

In view of the foregoing, disclosed herein are embodiments of a structure with a substrate-embedded arrow waveguide. Specifically, the structure can include a semiconductor substrate, a trench within the semiconductor substrate, and an arrow waveguide within the trench. The waveguide can include cladding material lining the bottom and opposing sides of the trench, a core within the trench on the cladding material, and at least one cavity within the core. Each cavity can be elongated (e.g., horizontal tube or pipe shaped), can extend from one end of the core toward and, optionally, to the opposite end, and can contain a low refractive index material (e.g., air or some other gas, liquid, or solid material with a low refractive index) or can be under vacuum. With this configuration, the waveguide effectively functions as an arrow waveguide using thin film interference caused by the cavity or cavities to guide light through the core with low loss. The structure can further include an insulator layer on the semiconductor substrate extending laterally over the waveguide and a semiconductor layer on the insulator layer. In some embodiments, the structure can also include one or more additional optical and/or electronic devices above the insulator layer. For example, the structure can include an additional waveguide that is aligned above the substrate-embedded arrow waveguide either on the isolation region or on a waveguide extender that extends through the isolation region and the insulator layer to the waveguide.

Also disclosed herein are method embodiments for forming such a structure with a substrate-embedded arrow waveguide. In the method embodiments, a trench is formed in a bulk semiconductor substrate, the substrate-embedded arrow waveguide is formed within the trench, and an insulator layer is formed on the substrate over the waveguide prior to a wafer bonding process that results in the semiconductor-on-insulator structure (i.e., the semiconductor layer on the insulator layer on the semiconductor substrate). Subsequently, front-end-of-the-line (FEOL) processing can be performed to form one or more additional optical and/or electronic devices above the insulator layer. By embedding the waveguide within the semiconductor substrate prior to the wafer bonding as opposed to forming it during FEOL processing, strict limitations on the waveguide core dimensions are avoided. Thus, the waveguide core can be relatively large and, particularly, large enough to have a relatively long cut-off wavelength and also large enough to contain the above-described cavity or cavities for arrow waveguide functionality. Furthermore, because the core of the substrate-embedded optical waveguide is relatively large, improved coupling with an off-chip optical fiber can be achieved.

Figure 1A:
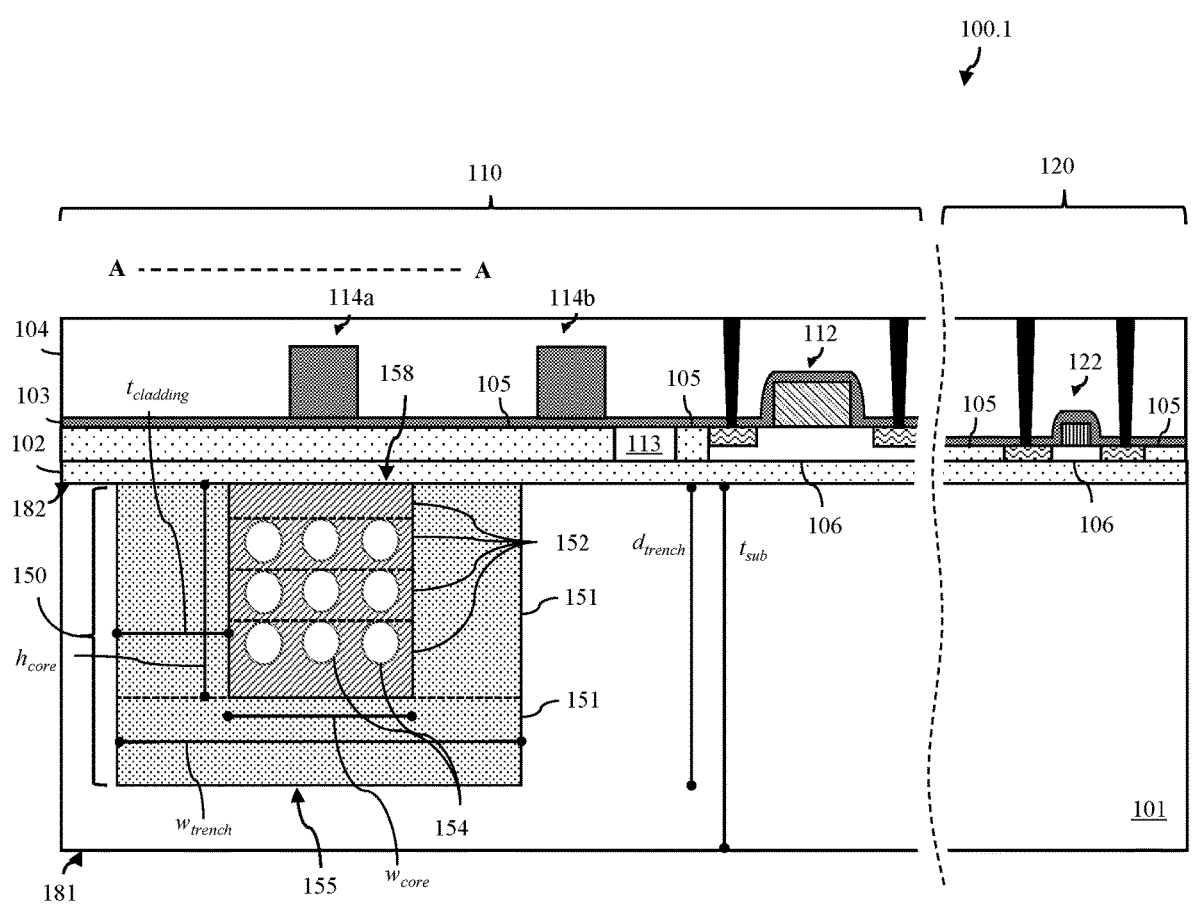
FIGS. 1A-1B are different cross-sections and FIG. 1C is a layout diagram of an embodiment of a structure.
Figure 1B:
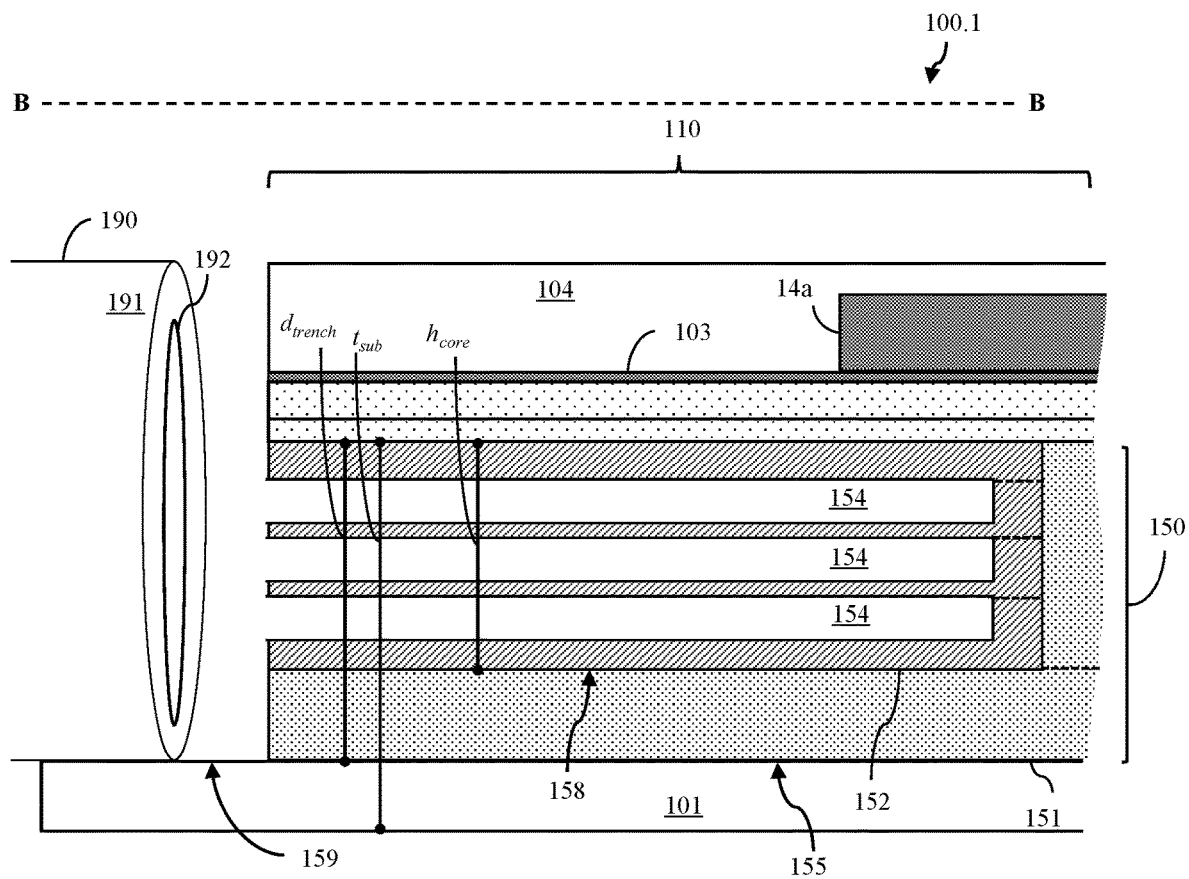
Figure 1C:
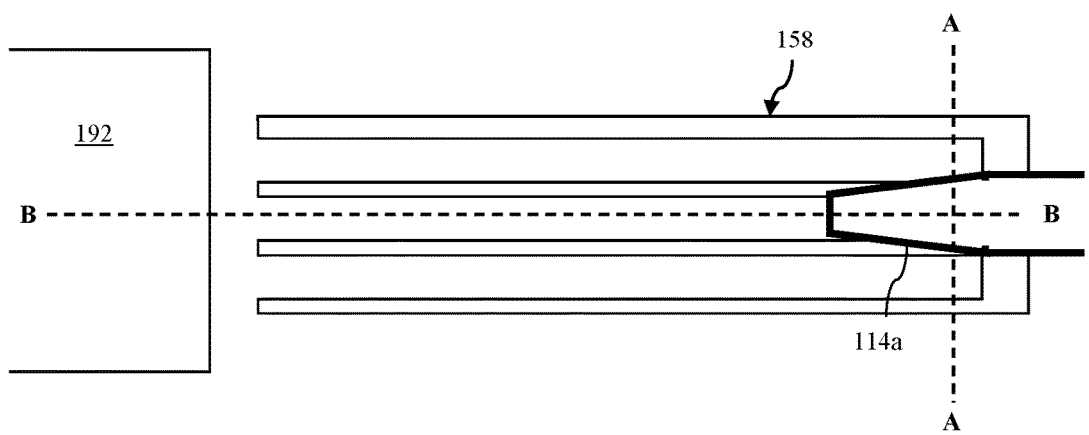
Figure 2A:
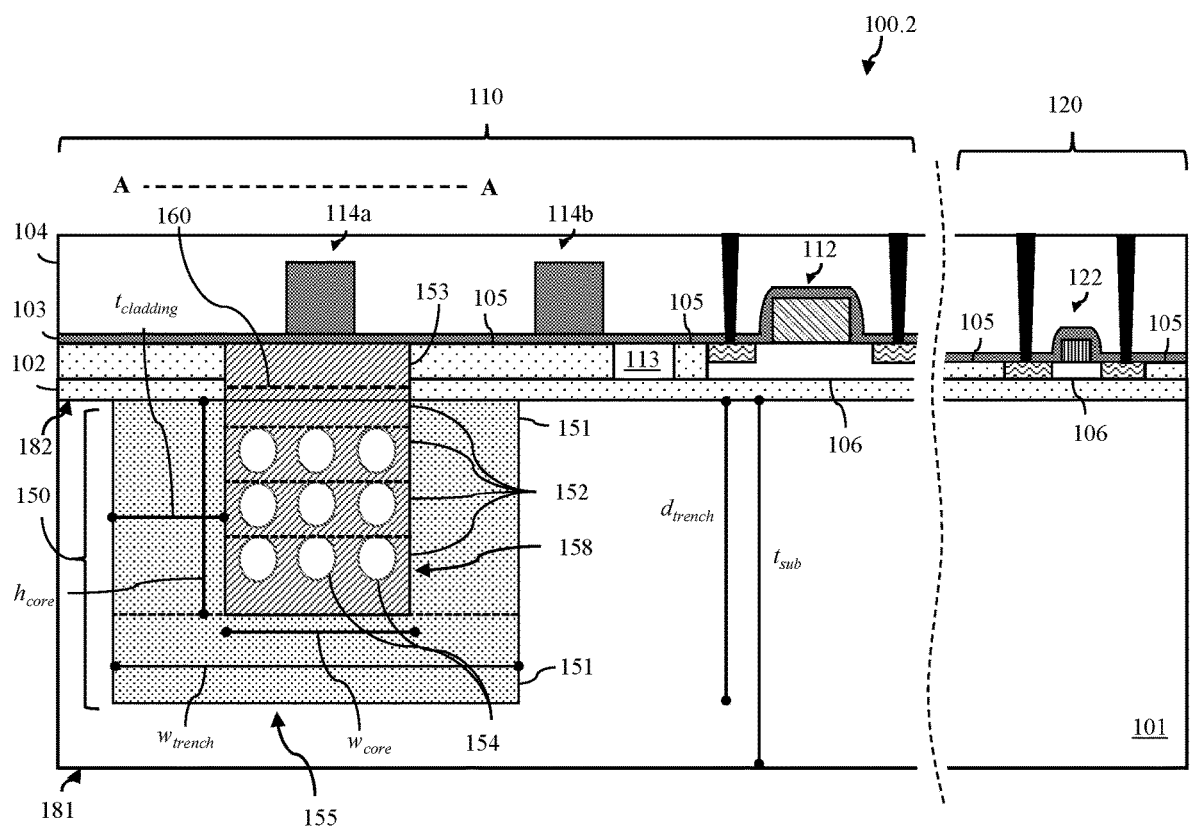
FIGS. 2A-2B are different cross-section diagrams and FIG. 2C is a layout diagram illustrating another embodiment of a structure.
Figure 2B:
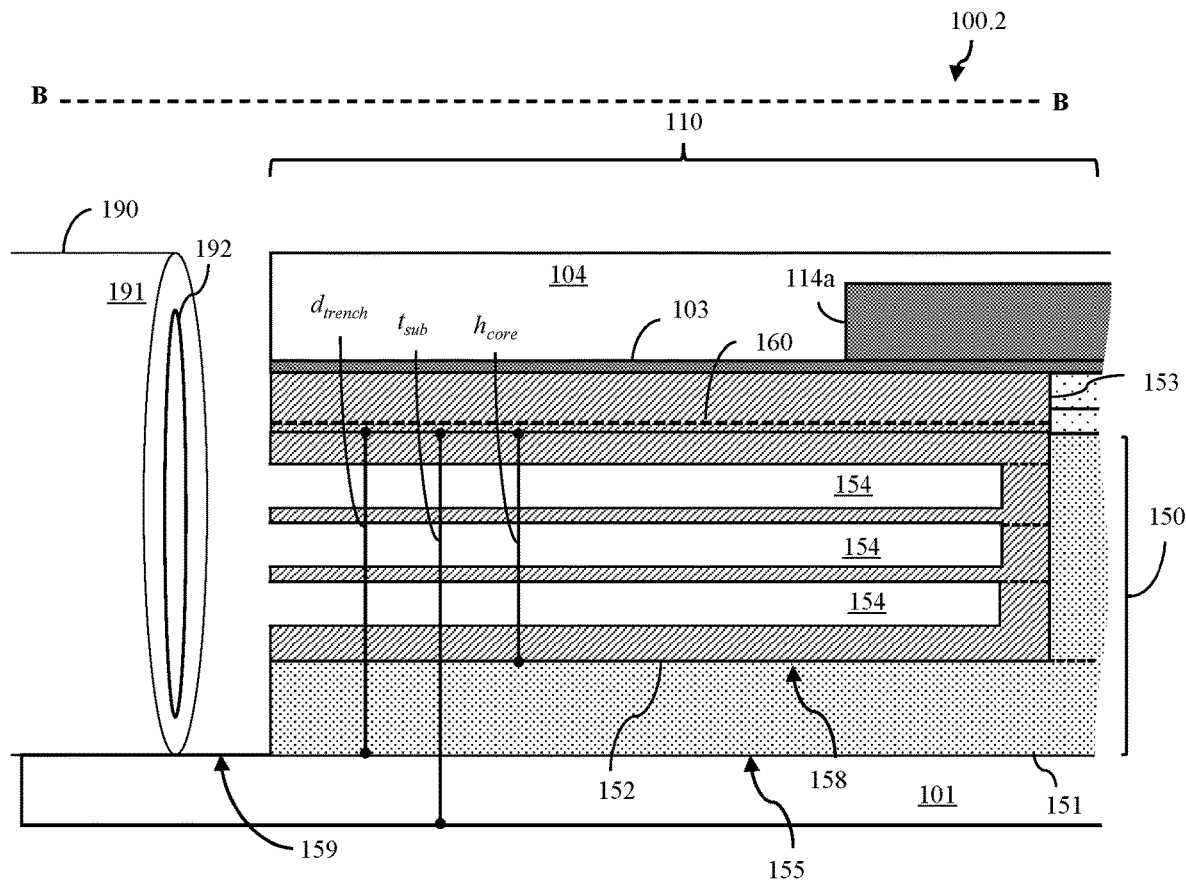
Figure 2C:
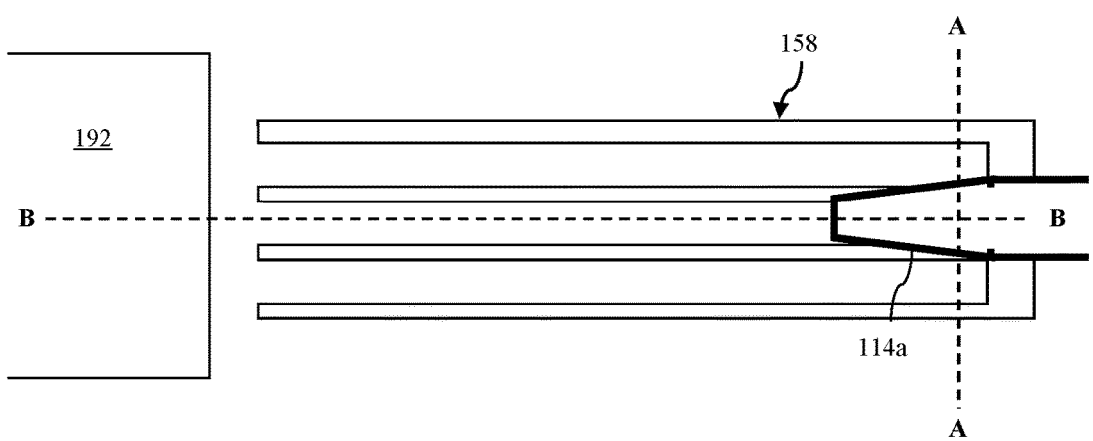
Figure 3:
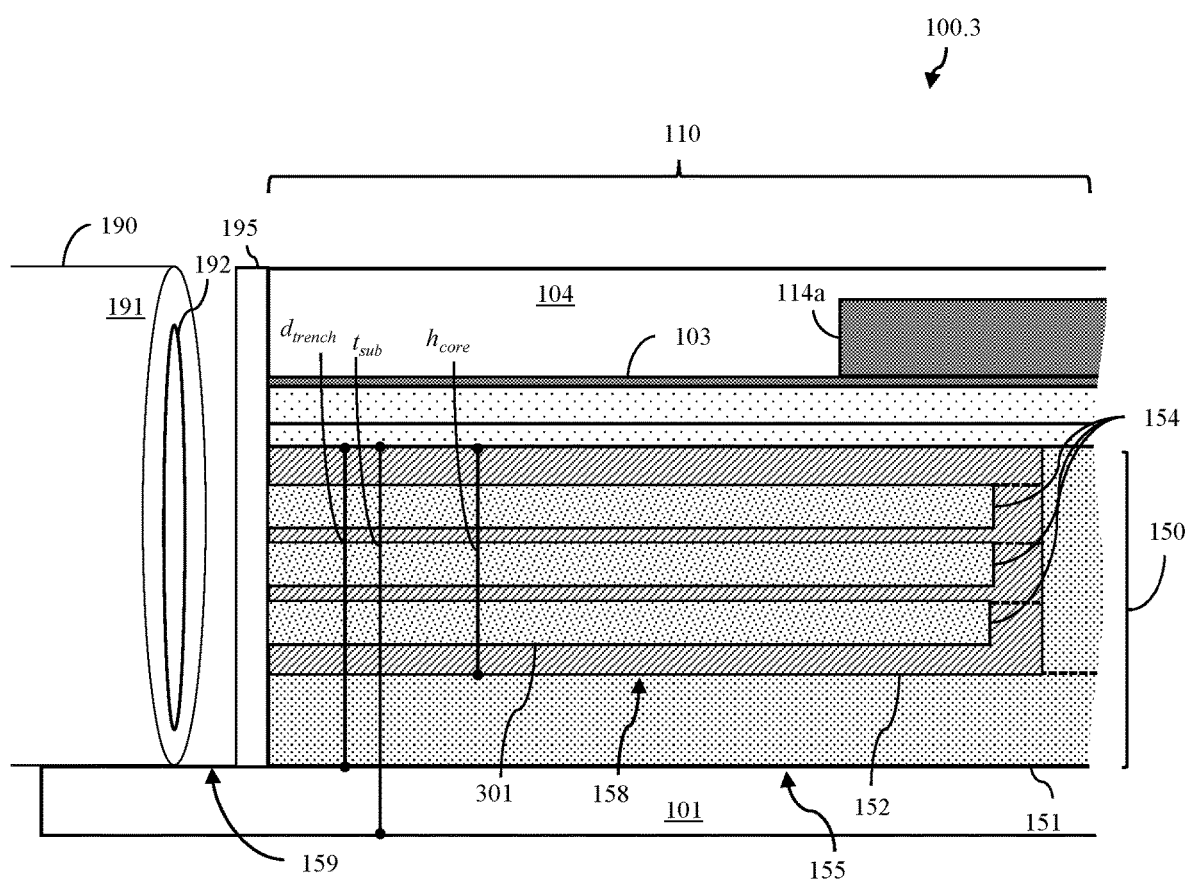
FIG. 3 is cross-section diagram illustrating yet another embodiment of a structure.
Figure 5:
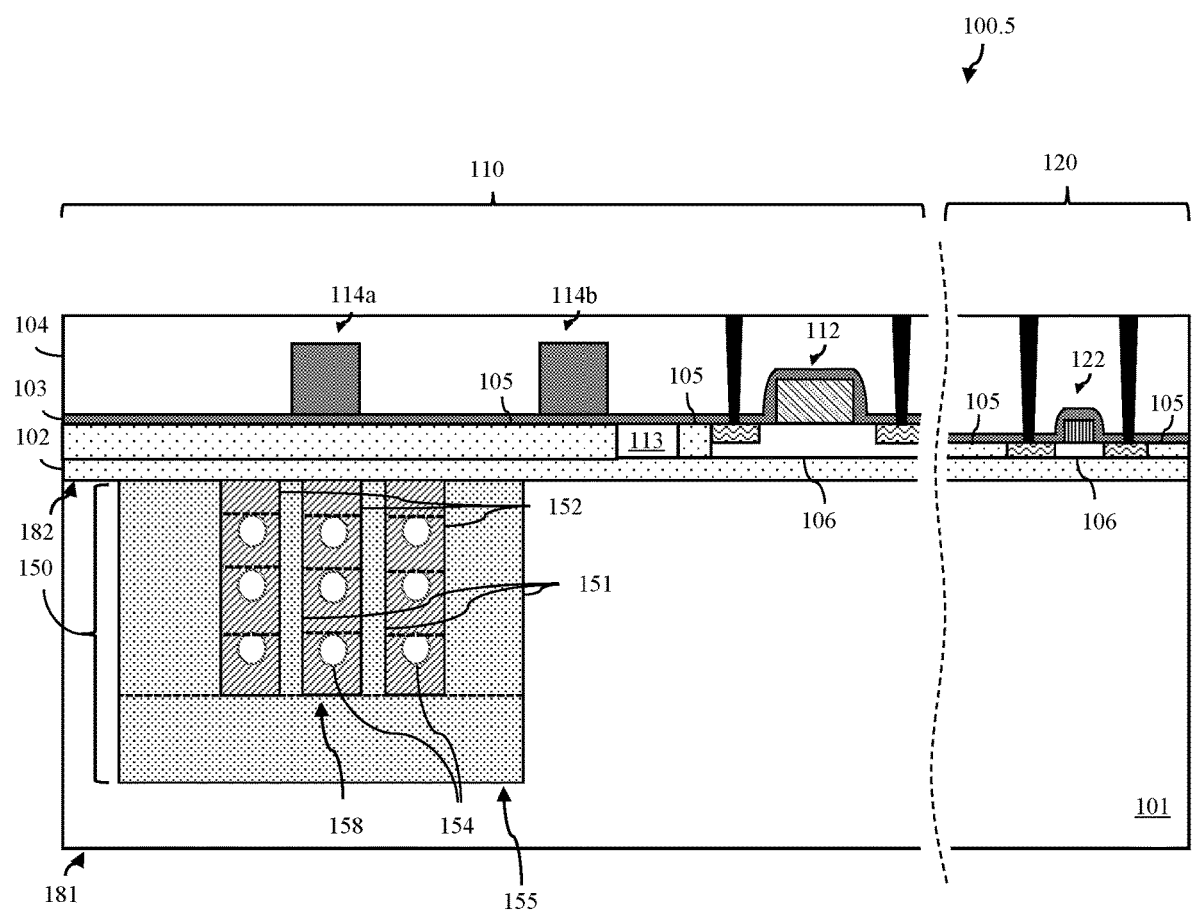
FIG. 5 is cross-section diagram illustrating yet another embodiment of a structure.

FIGS. 1A-1B are different cross-sections and FIG. 1C is a layout diagram of an embodiment of a structure 100.1 disclosed herein. FIGS. 2A-2B are different cross-section diagrams and FIG. 2C is a layout diagram illustrating an embodiment of a structure 100.2 disclosed herein. FIG. 3 is cross-section diagram illustrating an embodiment of a structure 100.3 disclosed herein. FIGS. 4.1 and 4.2 are cross-section diagrams illustrating alternative embodiments of a structure 100.4 disclosed herein. FIG. 5 is cross-section diagram illustrating an embodiment of a structure 100.5 disclosed herein. Each structure 100.1-100.5 includes a substrate-embedded arrow waveguide 150.

More particularly, referring to FIGS. 1A-5, the structure 100.1-100.5 can include a semiconductor substrate 101. This semiconductor substrate 101 can be, for example, a bulk monocrystalline silicon (Si) substrate. Alternatively, the semiconductor substrate 101 could be a bulk substrate of some other suitable monocrystalline semiconductor material. This semiconductor substrate 101 can have a bottom surface 181 and a top surface 182 opposite the bottom surface. The bottom surface 181 and the top surface 182 can be essentially planar and parallel to each other. The thickness of the substrate 101 ($t_{sub}$), as measured from the bottom surface 181 to the top surface 182, can range from, for example, 1 micron (μm) to 10 μm or even larger (e.g., 50 μm, 100 μm, 150 μm, 200 μm or higher).

The structure 100.1-100.5 can be partitioned into one or more device areas. The device areas can include, for example, an optical device area 110 and, optionally, an electronic device area 120.

The structure 100.1-100.5 can further include at least one substrate-embedded arrow waveguide 150 (hereinafter waveguide 150) within the optical device area 110. Specifically, a trench 155 can extend into the substrate 101 from the top surface 182 toward the bottom surface 181. The size of the trench 155 (including the depth ($d_{trench}$) of the trench 155 as measured from the top surface 182 of the substrate 101 to the bottom of the trench 155 and the width ($w_{trench}$) of the trench 155 as measured between opposing sidewalls can vary depending upon the particular application and the thickness of the substrate 101 ($t_{sub}$). For example, in some embodiments, the trench 155 can be relatively shallow (e.g., $d_{trench}$ can be less than ¼ $t_{sub}$). In other embodiments, the trench 155 can be relatively deep (e.g., $d_{trench}$ can be greater than ¼, ½, ¾, etc. $t_{sub}$). Thus, depending upon $t_{sub}$, the $d_{trench}$ could range from less than 1 micron (μm) up to 10 μm or even larger (e.g., 50 μm, 100 μm, 150 μm, 200 μm or higher). $w_{trench}$ could further be less than, equal to, or even greater than $d_{trench}$.

The waveguide 150 can be contained within this trench 155. In the disclosed embodiments, the waveguide 150 can include a core 158, which is wrapped at least along the bottom surface and sidewalls with cladding material 151 and which contains one or more cavities 154. Those skilled in the art will recognize that the function of the cladding material is to confine optical signals within the core in order to facilitate signal propagation. As discussed in greater detail below, the function of the one or more cavities 154 is to guide light signals through the core 158.

More specifically, the waveguide 150 can include cladding material 151. The cladding material 151 can line the bottom surface, opposing sidewalls, and optionally one or both end walls of the trench 155. The waveguide 150 can further include a core 158. The core 158 can include a single elongated body, which can have a vertical cross-section that is essentially rectangular in shape, and which can be patterned from multiple stacked layers of core material 152 (e.g., see the structure 100.1 of FIGS. 1A-1C, 100.2 of FIGS. 2A-2C, 100.3 of FIG. 3 or 100.4 of FIG. 4). Alternatively, the core 158 can include multiple essentially parallel elongated bodies with vertical cross-sections that are essentially rectangular in shape, patterned from multiple layers of core material 152, and physically separated by cladding material 151 (e.g., see the structure 100.5 of FIG. 5). In any case, the elongated body (or bodies) of the core 158 can have a first end and a second end opposite the first end. As discussed in greater detail below, the first end of the waveguide 150 can, for example, be located adjacent to a V-shaped groove 159, which is within the semiconductor substrate 101 and within which an off-chip optical fiber 190 can be seated such that the waveguide 150 can be coupled to the off-chip optical fiber 190. Additionally, the second end of the waveguide 150 can be located so as to enable coupling with another on-chip optical device (e.g., see the additional waveguide 114a). In any case, the core 158 can be essentially centered upon a horizontal portion of the cladding material 151 and vertical portions of the cladding material 151 can be positioned laterally adjacent to and can cover the opposing sidewalls and, optionally, one or both end walls of each elongated body.

It should be understood that the dimensions of the core 158 will vary depending upon the dimensions of the trench 155 (e.g., $d_{trench}$ and $w_{trench}$) as well as the thickness ($t_{cladding}$) of the layer of cladding material 151. For example, if $d_{trench}$ is approximately 60 μm, $w_{trench}$ is approximately 60 μm, and $t_{cladding}$ is approximately 20 μm, then the overall width ($w_{core}$) of the core 158 would be approximately 20 μm and the height ($h_{core}$) of the core 158 would be approximately 40 μm.

The waveguide 150 can further include one or more cavities 154 within the core 158. Each cavity 154 can be an elongated cavity (e.g., a horizontal tube-shaped cavity or horizontal pipe-shaped cavity) within the core material 152 and extending, for example, from the first end toward and, optionally, to the second end of the core 158. For purposes of illustration, each structure 100.1-100.5 is shown as including a waveguide 150 with an array of multiple cavities 154 arranged in rows and columns. In each row, laterally adjacent cavities are physically separated by core material 152. In the structure 100.5 of FIG. 5, the laterally adjacent cavities in each row are shown as being contained in different elongated bodies of the core 158 and, thus, are physically separated by both cladding and core material 151-152. In any case, in each column, vertically stacked cavities are physically separated by core material 152 and are contained within different layers of the core material 152. However, as mentioned above, a waveguide 150 in the disclosed embodiments can include any number of one or more cavities 154 and, thus, FIGS. 1A-5 are not intended to be limiting. Alternatively, any other suitable arrangement of cavities 154 could be employed.

For example, one illustrative cavity pattern, as seen in a vertical cross-section that traverses the core 158 widthwise, can include an array of multiple cavities 154 arranged in columns and rows (e.g., see FIGS. 1A-5 or FIG. 6.1). Other illustrative cavity patterns can, however, include a single cavity (e.g., see FIG. 6.2), a single column of multiple cavities (e.g., see FIG. 6.3), a single row of multiple cavities (see FIG. 6.4), an oval pattern of multiple cavities (e.g., see FIG. 6.5), a polygon pattern of multiple cavities (e.g., a rectangular pattern of cavities, as shown in FIG. 6.6, or some other suitable pattern for guiding light signals, such as a pentagon pattern, a hexagon pattern, an octagon pattern, etc.), a random pattern of multiple cavities (e.g., see FIG. 6.7) or any other suitable pattern of the multiple cavities for guiding light signals. As discussed in greater detail below with regard to the method embodiments, for any row of cavities 154 or any other arrangement of cavities where two or more cavities are located at essentially the same level above the bottom of the trench 155, those cavities will be contained within the same layer of core material 152. For any column of cavities 154 or any other arrangement of cavities where two or more cavities are located at different levels above the bottom of the trench 155, those cavities will be contained within different layers of the core material.

In the waveguide 150, the cladding material 151 can have a first refractive index and the core material 152 can be selected so as to have a second refractive index that is greater than the first refractive index. The differential in the refractive indices between the cladding and core materials facilitates confinement by the cladding material of the optical signals within the core material due to reflection at interfaces between the two materials. In some embodiments, the cladding material 151 can be an oxide material, such as silicon dioxide ($SiO_2$), with a refractive index of less than 2.0 and, more particularly, less than 1.6. In other embodiments, the cladding material 151 could be a different oxide material or some other suitable cladding material with a similarly low refractive index and, particularly, with a first refractive index that is less than the second refractive index of the core material. In some embodiments, the core material 152 could be a nitride material, such as silicon nitride (SiN), with a refractive index of greater than 2.0. In other embodiments, the core material 152 could be an oxide material, which is different from that used for the cladding material 151 and which has a relatively high refractive index compared to the cladding material 151. For example, in some embodiments, the core material 152 could be niobium oxide (NbO) with a refractive index of approximately 2.2 or higher. In other embodiments, the core material 152 could be any other suitable core material with a similarly high refractive index and, particularly, with a second refractive index that is greater than the first refractive index of the cladding material.

Additionally, in the waveguide 150, each cavity 154 can contain an additional material with a third refractive index that is at least less than the second refractive index of the cladding material 151. In some embodiments, each cavity 154 can be essentially hollow containing only ambient air with a refractive index of approximately 1.0003 (e.g., see the structures 100.1-100.2 of FIGS. 1A-2C). In other embodiments, each cavity 154 can contain a flowable material 301 (e.g., a gas or a liquid) with a relatively low refractive index (e.g., see the structure 100.3 of FIG. 3). It should be noted that if the cavity or cavities 154 are open at the first end of the core 158 adjacent to the V-shaped groove 159, cavity filling and capping (e.g., see cap 195) can be performed at the chip packaging level. In still other embodiments, each cavity 154 can contain a solid material 401 with a relatively low refractive index (e.g., see the structure 100.4 of FIGS. 4.1 and 4.2). In these alternative embodiments, each cavity 154 can be either lined with the solid material 401, as illustrated in FIG. 4.1, or completely filled with the solid material 401, as illustrated in FIG. 4.2. The solid material 401 could be the same material used for the cladding material 151. For example, if the core material 152 is SiN, the cladding material 151 and the solid material 401 contained within each cavity could be SiO2. Alternatively, each cavity 154 could be fully encapsulated (e.g., capped, as shown in FIG. 3) but under vacuum (i.e., devoid of matter) so as to have a very low refractive index of 1 (which is less than that of the cladding and core materials 151-152). In any case, with this configuration where the core 158 includes one or more low refractive index elongated cavities 154, the waveguide 150 effectively functions as an arrow waveguide using thin film interference caused by the low refractive index cavity or cavities 154 to guide light signals through the core 158 from end to end with low loss.

Various core materials, cladding materials, and cavity fill materials are discussed above with regard to the structures 100.1-100.5 shown in FIGS. 1.A-5. It should be noted that the materials discussed have been offered for illustration purposes and are not intended to be limiting. The following is a sample list of materials (including the refractive indices (n) thereof) from which core, cladding, and/or cavity fill material could be selected for a waveguide 150 as long as desired refractive index differentials are achieved between the cladding material and the core and between the core and the cavity fill material and to the extent allowed by available processing techniques now or in the future: SiGe (Silicon germanium), n=~5.4; Polysilicon, n=~3.9; cSi (Monocrystalline silicon) n=~3.9; HfO2 (Hafnium dioxide), n=2.0754 @1.31 μm, n=2.0709 @1.55 μm; ZrO2 (Zirconium dioxide, Zirconia), n=2.1155 @1.31 μm, n=2.1103 @1.55 μm; Si3N4 (Silicon nitride), n=~2; SiON (Silicon oxynitride), n=~1.46 to ~2.1; AlN (Aluminum nitride), n=~2.1 to ~2.4; TiO2 (Titanium dioxide), n=2.4622 @1.31 μm, n=2.4538 @1.55 μm; ZnO (Zinc monoxide), n=1.9318 @1.31 μm, n=1.9267 @1.55 μm; Al2O3 (Aluminum oxide), n=1.7503 @1.31 μm, n=1.7462 @1.55 μm; MgO (Magnesium oxide), n=1.7178 @1.31 μm, n=1.7146 @1.55 μm; SiO2 (Silicon dioxide), n<1.6, n=1.45 @1.31 μm; CaF2 (Calcium fluoride), n=1.4272 @1.31 μm, n=1.4260 @1.55 μm; OMCTS (SiCOH) n=1.406 @1.31 μm; and MgF2 (Magnesium fluoride), n=1.3718 @1.31 μm, n=1.3705 @1.55 μm.

In any case, the structure 100.1-100.5 can further include an insulator layer 102 on the top surface 182 of the substrate 101. This insulator layer 102 can be, for example, an SiO2 layer (also referred to herein as a buried oxide (BOX) layer) or any other suitable insulator layer. It should be noted that the thickness of the insulator layer 102 can be vary depending upon the application and the technology node. For example, the thickness of the insulator layer 102 can range from less than 100 nm to 500 nm or even higher (e.g., up to 2000 nm). This insulator layer 102 can cover the top surface 182 of the substrate 101 and can further extend laterally over any embedded structures within the substrate 101 (e.g., over the waveguide 150).

The structure 100.1-100.5 can further include a monocrystalline semiconductor layer 106 (e.g., a monocrystalline Si layer) on the insulator layer 102. In some embodiments, the semiconductor layer 106 can be thinner within the electronic device area 120 than it is within the optical device area 110. For example, in some embodiments, the thickness of the semiconductor layer 106 within the electronic device area 120 can be between 10 nm and 100 nm (e.g., approximately 88 nm) and the thickness of the semiconductor layer 106 within the optical device area 110 can be between 125 nm and 175 nm (e.g., approximately 150 nm or 160 nm).

The structure 100.1-100.5 can further include isolation regions, such as shallow trench isolation (STI) regions 105, within the semiconductor layer 106. The STI regions 105 can include shallow trenches that extend fully through the semiconductor layer 106 to the insulator layer 102. Each of these shallow trenches can be filled with one or more layers of isolation material. The isolation material of the STI regions 105 can be SiO2 or any other suitable isolation material. The STI regions 105 can be patterned during processing so that they define the boundaries of and isolate devices, as necessary, within and between the various device areas. One STI region 105 can specifically be within the semiconductor layer 106 in the optical device area 110 aligned above the waveguide 150. This STI region 105 and the insulator layer 102 over the waveguide 150 can provide additional top surface cladding for the waveguide 150.

Optionally, the structure 100.1-100.5 can further include one or more front-end-of-the-line (FEOL) electronic devices in the electronic device area 120. Such FEOL electronic devices can include active semiconductor devices and/or passive semiconductor devices. Active semiconductor devices can include, for example, complementary metal oxide semiconductor (CMOS) devices (e.g., one or more field effect transistors (FETs) 122, as illustrated) or any other suitable type of active semiconductor device. Passive semiconductor devices could include, resistors, capacitors, etc. Such FEOL electronic devices are well known in the art and, thus, the details thereof have been omitted from this specification in order to allow the reader to focus on the salient aspects of the disclosed embodiments.

The structure 100.1-100.5 can further include, within the optical device area 110, one or more FEOL optical devices that are within or include a portion of the semiconductor layer 106 above the insulator layer 102. For example, the optical device area 110 could include a semiconductor waveguide 113 (e.g., a Si waveguide) with a core patterned from the semiconductor layer 106. Core dimensions of this semiconductor waveguide 113 (e.g., particularly height and width) can be significantly less than the core dimensions of the waveguide 150. Additionally, or alternatively, the optical device area 110 could include a photodetector 112 (e.g., a germanium photodetector) and/or an optical signal modulator that includes a portion of the semiconductor layer 106. Photodetectors and optical signal modulators are well known in the art and, thus, the details of these devices have been omitted from this specification in order to allow the reader to focus on the salient aspects of the disclosed embodiments.

The structure 100.1-100.5 can further include a conformal etch stop layer 103 extending over the optical device area 110 and, if applicable, the electronic device area 120. The etch stop layer 103 can, for example, cover the semiconductor waveguide 113, the photodetector 112, etc. in the optical device area 110 and any FEOL electronic devices in the electronic device area 120. The etch stop layer 103 can further cover any STI regions 105 within and between the optical and electronic device areas 110, 120. The etch stop layer 103 can be, for example, a silicon nitride (SiN) etch stop layer or a layer of any other suitable etch stop material.

The structure 100.1-100.5 can further include, within the optical device area 110, one or more additional waveguides 114a-114b above the etch stop layer 103. The core of any additional waveguide 114a-114b can be, for example, SiN or some other suitable high refractive index core material (e.g., silicon carbon nitride (SiCN), silicon oxynitride (SiON), aluminum nitride (AlN), gallium nitride (GaN), or alumina (Al2O3)). The additional waveguides 114a-114b can have the same or different core materials. In any case, the additional waveguide 114a can have at least one end aligned above and, particularly, overlaying the second end of the waveguide 150. The additional waveguide 114b can be offset from the waveguide 150. Core dimensions of each additional waveguide 114a-114b (e.g., particularly height and width) can be significantly less than the core dimensions of the waveguide 150.

It should be noted that the relative positioning of the additional waveguide 114a having one end overlaying the second end of the waveguide 150 can enable evanescent-wave coupling between the two waveguides 150 and 114a. Those skilled in the art will recognize that "evanescent-wave coupling between waveguides" refers to placement of two waveguides in sufficiently close proximity so that an evanescent field generated by waveguide excites a wave in the adjacent waveguide. However, depending upon the core and cladding materials in the two waveguides 150 and 114a and further, depending upon the separation distance between the cores thereof, evanescent-wave coupling may not be achievable. In this case, the structure can further include a waveguide extender 153 (e.g., see the structure 100.2 of FIGS. 2A and 2B). The waveguide extender 153 can extend through the STI region 105 and the insulator layer 102 down to the core 158 of the waveguide 150 such that the second end of the waveguide 150 and one end of the additional waveguide 114a are both in contact with and coupled to the waveguide extender 153 (as shown), thereby providing the needed coupling. Alternatively, the waveguide extender 153 could extend only partially through the STI region 105 and, optionally, the insulator layer 102 to some depth as indicated by line 160 such that the waveguide extender 153 is not in contact with the second end of the waveguide 150 but also such that proximity of the waveguide extender 153 to the second end of the waveguide 150 is sufficient to enable evanescent-wave coupling. The waveguide extender 153 could be made, for example, of the same core material as the core material 152 of the core 158 of the waveguide 150, of the same core material as the core material of the additional waveguide 114a, or of some other suitable core material. For purposes of illustration, the waveguide extender 153 is shown as being above a waveguide 150 configured such as the waveguide 150 shown in the structure 100.1 of FIGS. 1A-1B. However, it should be understood that the figures are not intended to be limiting and that such a waveguide extender 153 could, alternatively, be above a waveguide configured essentially the same as any of the waveguides shown in any of the disclosed structures 100.3 of FIG. 3, 100.4 of FIG. 4.1 or 4.2, or 100.5 of FIG. 5.

The structure 100.1-100.5 can further include one or more layers of interlayer dielectric (ILD) material 104 on the etch stop layer 103. The ILD material 104 can extend laterally over and cover the cores of the additional waveguides 114a-114b. The ILD material 104 can include, for example, doped silicon glass (e.g., phosphosilicate glass (PSG) or borophosphosilicate glass (BPSG)), silicon dioxide, or any other suitable ILD material. In any case, this ILD material 104 should have a relatively low refractive index (e.g., a refractive index of lower than 2.0) to allow it to be employed as cladding material for the additional waveguides 114a-114b. As mentioned above, the core dimensions of waveguides embedded in ILD material are limited by the maximum height of MOL contacts that extend through such ILD material to FEOL optical and/or electric devices.

Optionally, the structure 100.1-100.5 can further include a substrate-embedded isolation region (not shown) within the electronic device area 120 below the insulator layer 102. Such a substrate-embedded isolation region can reduce parasitic capacitance and harmonics. It should be noted that, by employing local substrate-embedded isolation regions below specific chip components, the need for a thick insulator layer 102 (i.e., a thick BOX layer) in some technologies can be eliminated.

It should be noted that, since the waveguide 150 is embedded within the substrate 101, it is not limited by CDs associated with the waveguides 113 and 114a-114b above the insulator layer 102 (which are typically measured in hundreds of nanometers (nm)). Thus, the core 158 can be relatively large and, particularly, large enough to have a relatively long cut-off wavelength and large enough to include the above-described cavity or cavities 154 for arrow waveguide functionality. Furthermore, because the core 158 of the waveguide 150 is relatively large, improved coupling with an off-chip optical fiber 190 can be achieved.

More specifically, in each of the embodiments, the structure can further include a V-shaped groove 159 in the semiconductor substrate 101 at one side (e.g., see FIGS. 1B, 2B, 3 and 4). This V-shaped groove 159 can be configured to receive an off-chip optical fiber 190. The optical fiber 190 can include a core layer 192, which is cylindrical, and a cladding layer 191 wrapped around the core layer 192. As mentioned above, the first end of the core 158 of the waveguide 150 can be adjacent to the V-shaped groove 159. More particularly, it can extend to the V-shaped groove 159 so that the core 158 of the waveguide 150 and the core layer 192 of the optical fiber 190 are in end-to-end alignment. Since the dimensions of the core 158 of the waveguide 150 can be relatively large, it can be designed so as to have one or more dimensions (e.g., height or height and width) that match or at least approximate corresponding dimension(s) of the core layer 192 of the optical fiber 190 to facilitate mode matching and improve coupling between the off-chip optical fiber 190 and the waveguide 150.

Figure 7:
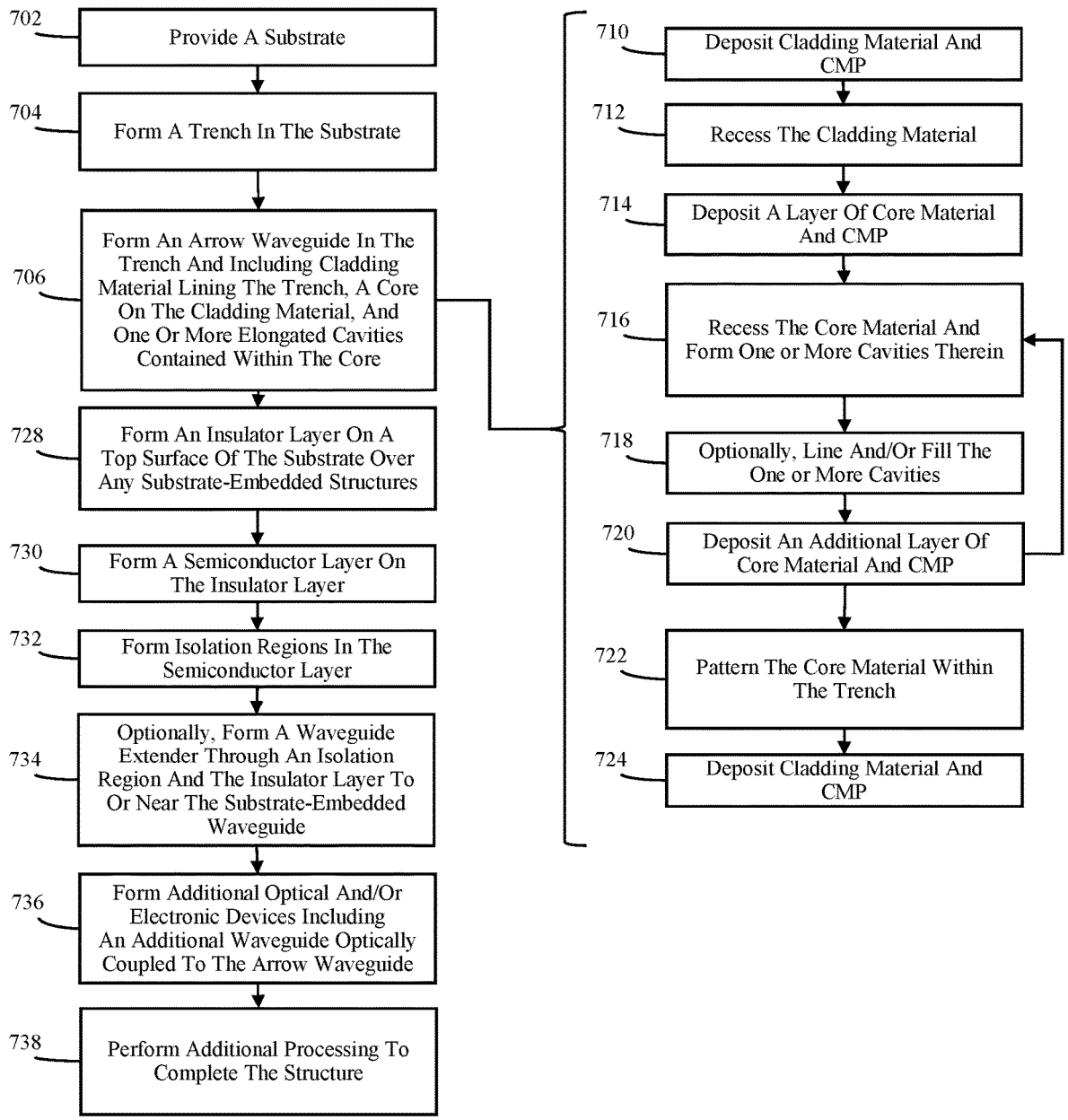
FIG. 7 is a flow diagram illustrating method embodiments for forming the disclosed structure embodiments.

Referring to the flow diagram of FIG. 7, also disclosed herein are method embodiments for forming the structures 100.1-100.5, as described above and illustrated in FIGS. 1A-5, including a substrate-embedded arrow waveguide.

Figure 8:
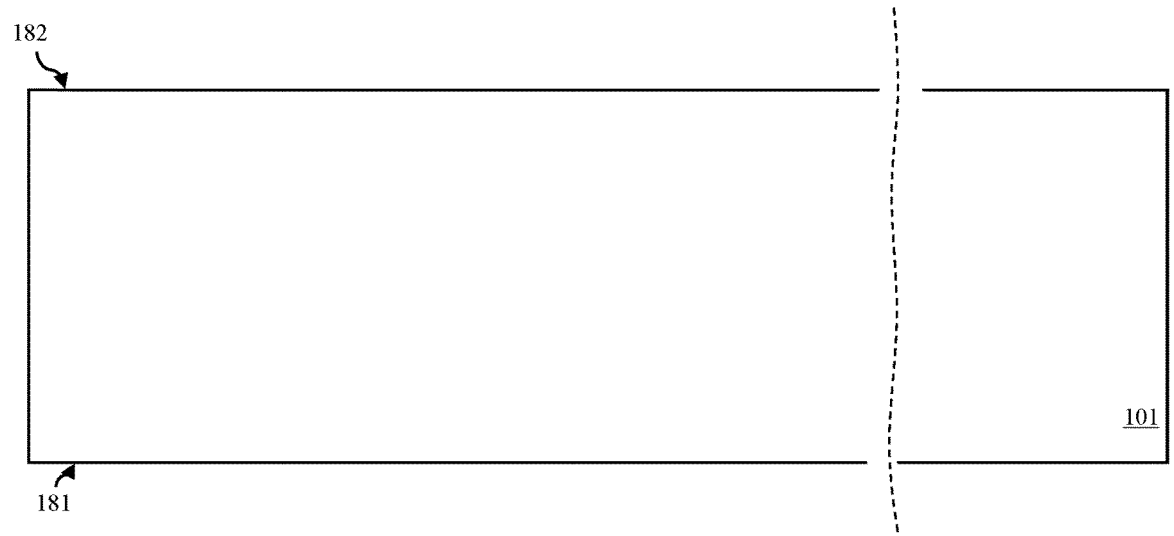
FIG. 8-13 are cross-section diagrams illustrating partially completed structures formed according to the flow diagram of FIG. 7.

The method can include providing a bulk semiconductor substrate 101 (see process 702 and FIG. 8). This semiconductor substrate 101 can be, for example, a monocrystalline silicon (Si) substrate. Alternatively, the semiconductor substrate 101 could be any other suitable monocrystalline semiconductor substrate. This substrate 101 can have a bottom surface 181 and a top surface 182 opposite the bottom surface. The bottom surface 181 and the top surface 182 can be essentially planar and parallel to each other.

Figure 9:
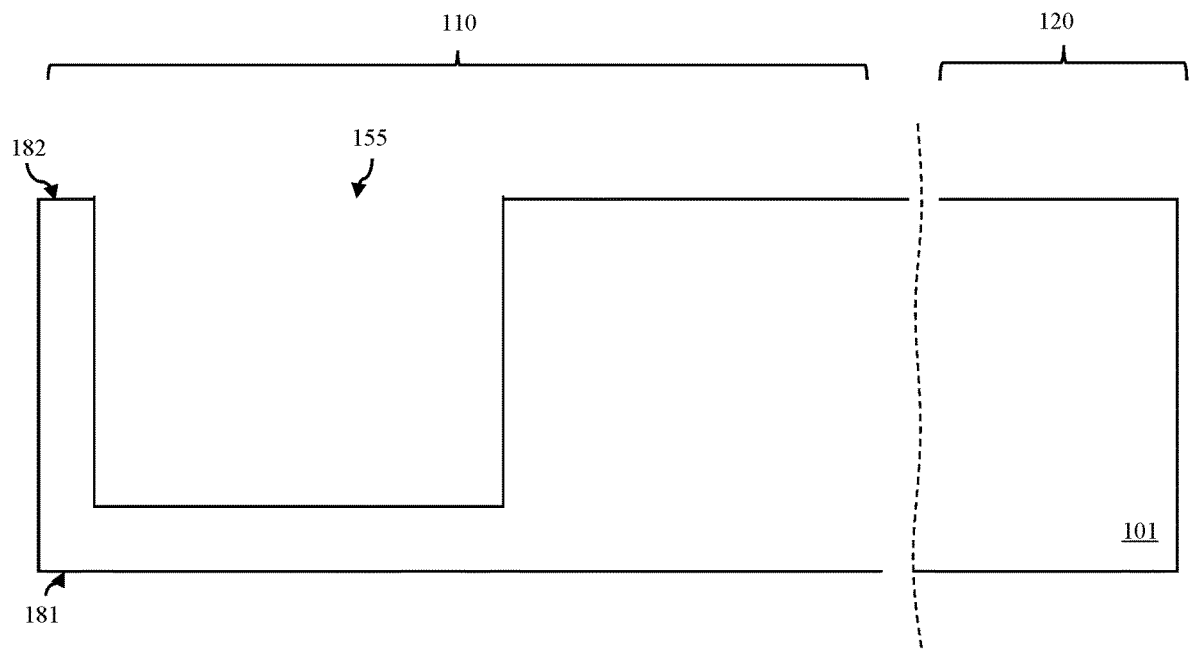

The method can further include forming a trench 155 in the substrate 101 (see process 704 and FIG. 9). The trench 155 can be formed at process 704 using conventional lithographic patterning and etch processes such that it extends from the top surface 182 toward the bottom surface 181. It should be noted that the dimensions of the trench 155, including the depth ($d_{trench}$) of the trench 155 (as measured from the top surface 182 of the substrate 101 to the bottom of the trench 155) and the width ($w_{trench}$) of the trench 155 as measured between opposing sidewalls, can be predetermined depending upon the desired application including the desired dimensions of the core 158. For example, $d_{trench}$ will be less than the full thickness ($t_{sub}$) of the semiconductor substrate 101. Additionally, $d_{trench}$ and $w_{trench}$ could each range from less than 1 micron (μm) up to 10 μm or even larger (e.g., 50 μm, 100 μm, 150 μm, 200 μm or higher) with $w_{trench}$ being less than, equal to, or greater than $d_{trench}$. In some embodiments, $d_{trench}$ and $w_{trench}$ could both be approximately 60 μm.

The method can further include forming a waveguide 150 within the trench 155 (see process 706 and FIGS. 10-22).

The waveguide 150 can be formed at process 706 such that it includes a core 158, which is wrapped in cladding material 151 and which includes one or more cavities 154.

Figure 10:
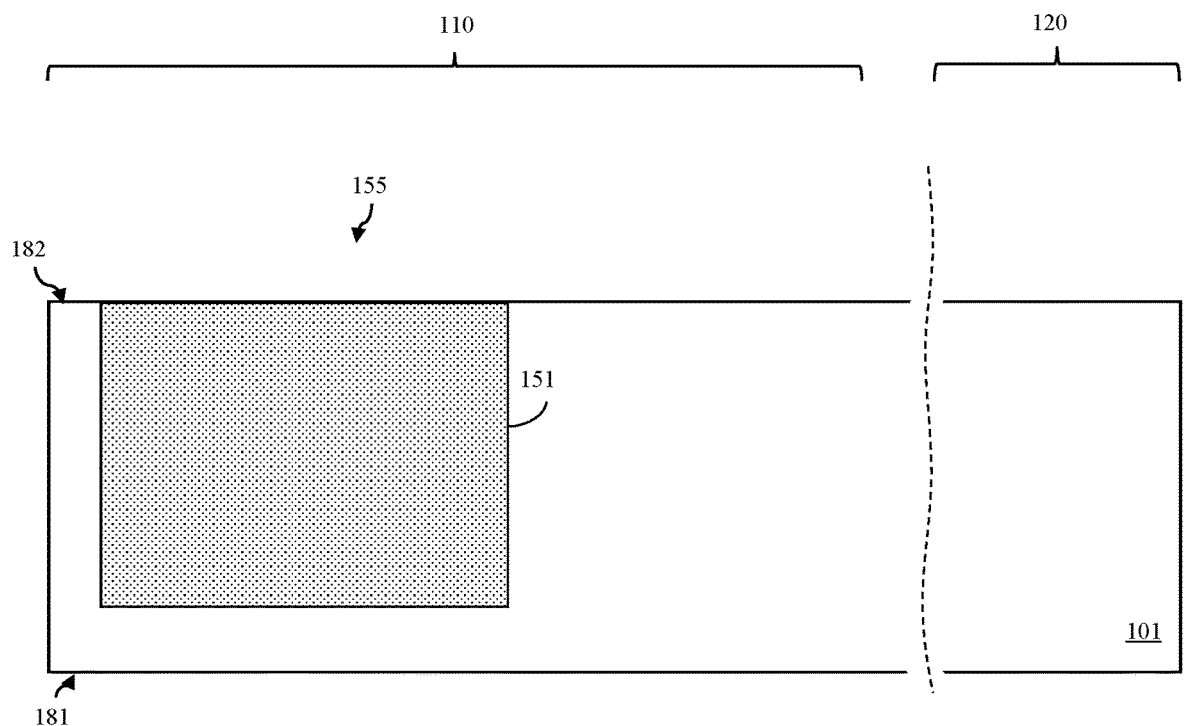
Figure 11:
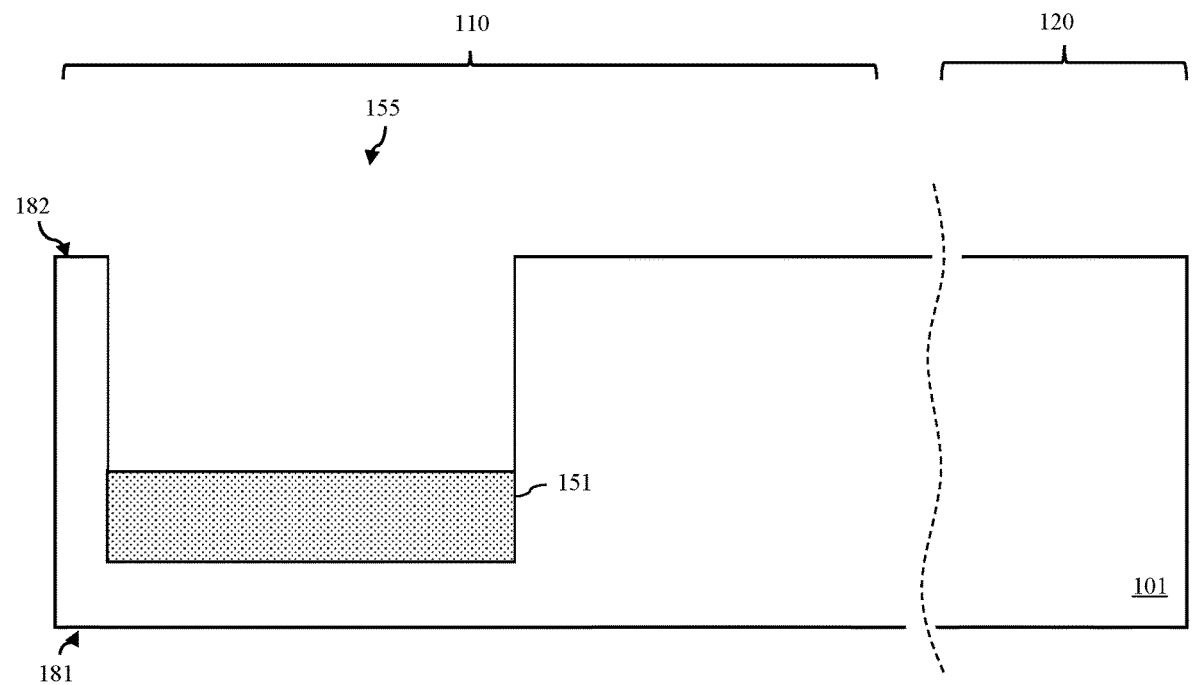

More specifically, formation of the waveguide 150 at process 706 can include depositing a layer of cladding material 151 so as to fill the trench 155 and performing a polishing process (e.g., a conventional chemical mechanical polishing (CMP) process) to remove any cladding material 151 from the top surface 182 of the substrate 101 (see process 710 and FIG. 10). The cladding material 151 can have a first refractive index. Examples of cladding material 151 that can used are discussed in greater detail above with regard to the structure embodiments. Following the polishing process, the remaining cladding material 151 within the trench 155 can be recessed to a desired depth using, for example, a selective anisotropic etch process (see process 712 and FIG. 11). Process 712 can be performed so that the remaining cladding material 151 at the bottom of the trench 155 has a desired thickness ($t_{cladding}$) at the bottom of the trench 155.

Figure 12:
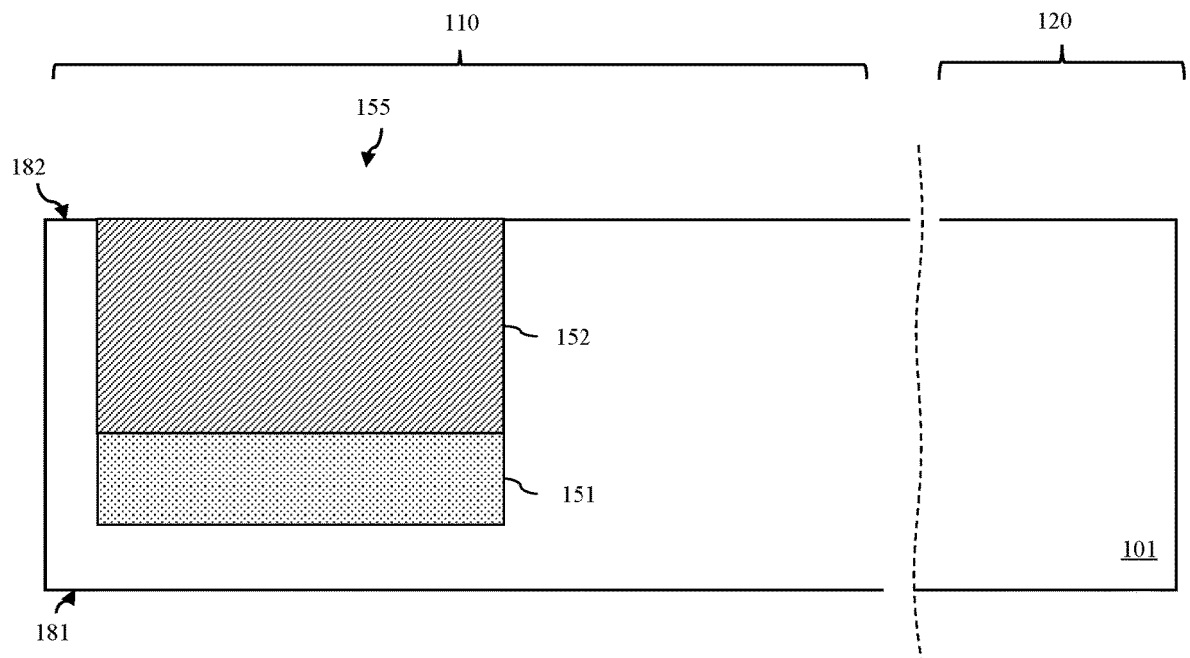
Figure 13:
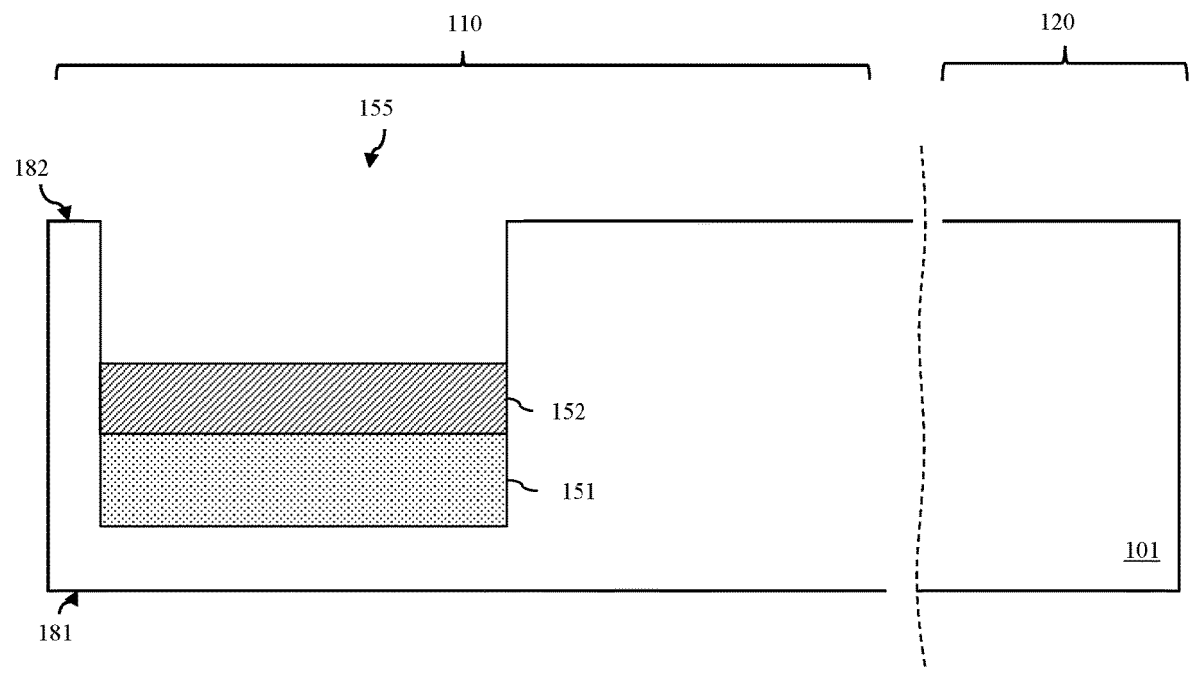
Figure 14A:
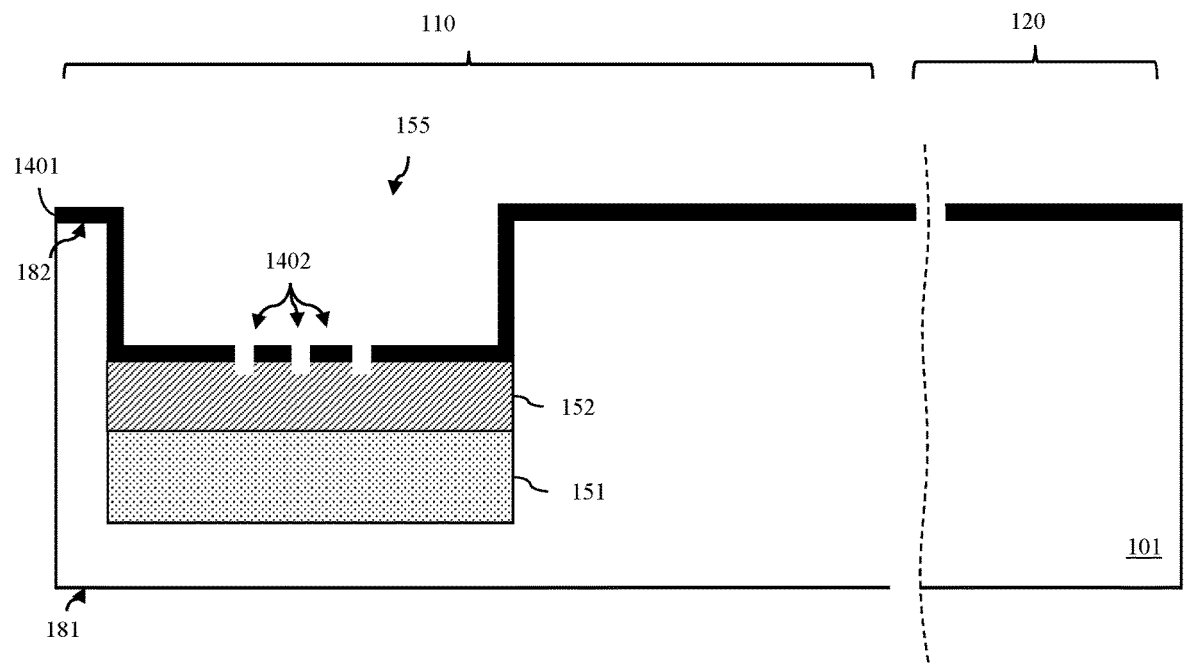
FIGS. 14A and 14B are cross-section and top view diagrams illustrating a partially completed structure formed according to the flow diagram of FIG. 7.
Figure 14B:
Figure 15:
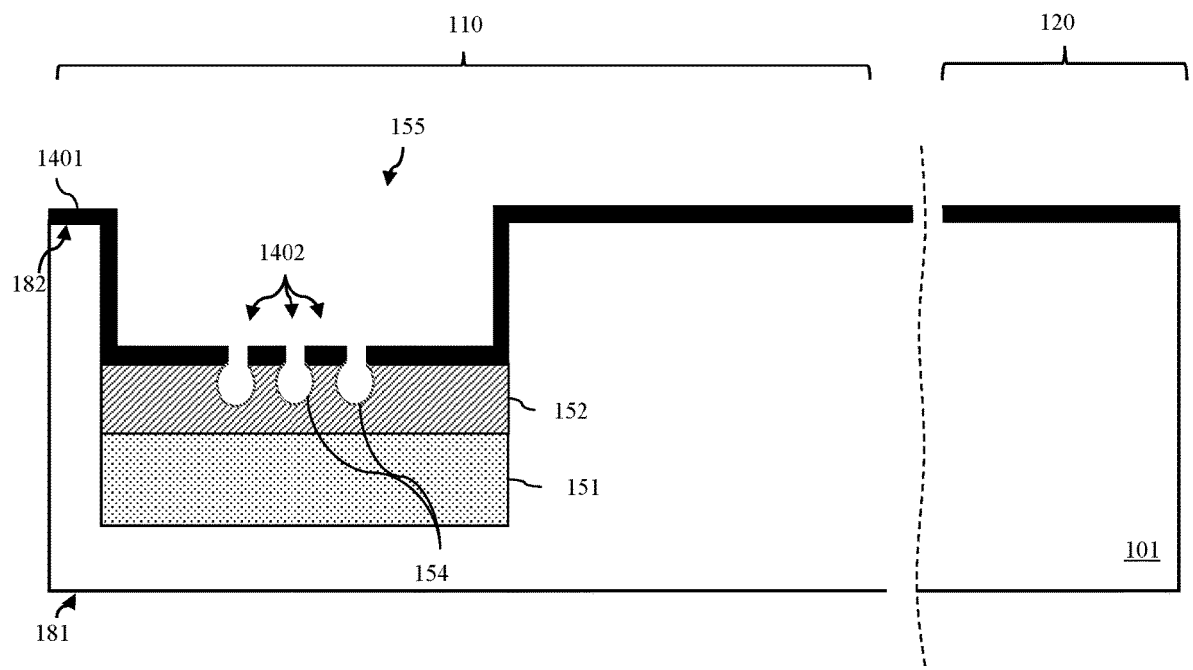
FIGS. 15-24 are cross-section diagrams illustrating partially completed structures formed according to the flow diagram of FIG. 7.

Formation of the waveguide 150 at process 706 can further include depositing a layer of core material 152 over the partially completed structure and, particularly, within the trench 155 on the cladding material 151 (see process 714 and FIG. 12). The core material 152 can have a second refractive index that is greater than the first refractive index. Examples of core material 152 that can be used are discussed in greater detail above with regard to the structure embodiments. A polishing process (e.g., a conventional CMP process) can then be performed to remove any core material 152 from above the top surface 182 of the substrate 101. The remaining core material 152 within the trench 155 can be recessed to a desired depth and one or more cavities 154 can be formed therein (see process 716 and FIGS. 13-15). Recessing of the core material 152 at process 716 can be performed using, for example, a selective anisotropic etch processes (see FIG. 13). Once or more cavities 154 can then be formed within this recessed layer of core material 152. For example, a conformal hardmask layer 1401 (e.g., a conformal SiN layer) can be formed over the partially completed structure and one or more elongated, essentially rectangular-shaped, openings 1402 oriented in the same direction as the waveguide 150 along the length of the trench 155 can be formed in the hardmask layer 1401 (see FIGS. 14A-14B). Formation of the openings 1402 can be performed, for example, using conventional lithographic patterning and etch processes. The openings 1402 can expose corresponding section(s) of the core material 152 below. Next, a selective isotropic etch process can then be performed to etch the exposed sections of the core material 152, thereby forming the one or more cavities 154 within core material 152 aligned below and wider than the one or more openings 1402, respectively (see FIG. 15). It should be noted that core material 152 below the hardmask should have a predetermined thickness and the selective isotropic etch process should be performed for some predetermined time, based on the predetermined thickness of the core material layer and on the desired size of each cavity, so that the cavities do not breach the core material 152.

It should be noted that, although not shown, at this point in the processing formation of the alternative embodiments of the structure 100.4 of FIG. 4.1 or 4.2 would further include lining and/or filling the one or more cavities 154 with some solid material having a lower refractive index than the core material 152 (see process 718). Examples of solid cavity fill materials 401 that could be used to line the cavities as shown in FIG. 4.1 or fill the cavities as shown in FIG. 4.2 are discussed in greater detail above. Various techniques for lining and/or filling cavities with such materials (e.g., SiO2 or other low refractive index materials) are known in the art and, thus, the details thereof have been omitted from this specification in order to allow the reader to focus on the salient aspects of the disclosed embodiments.

Following process 716 (and, if applicable, process 718), the hardmask layer 1401 can then be removed.

Figure 16:
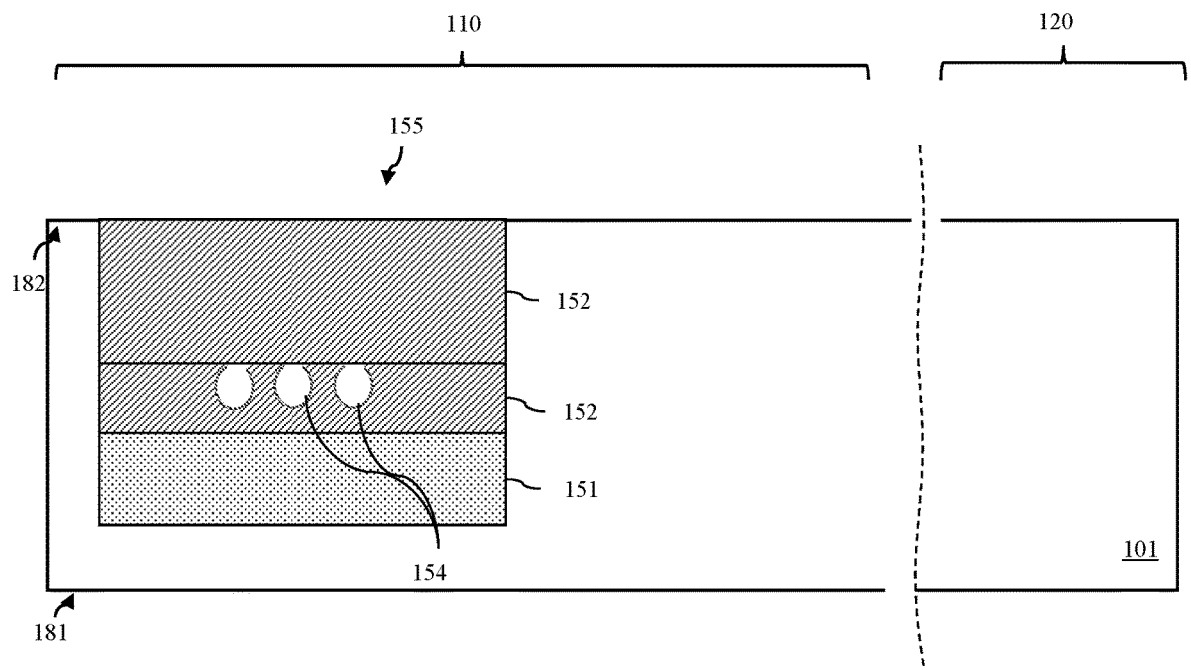
Figure 17:
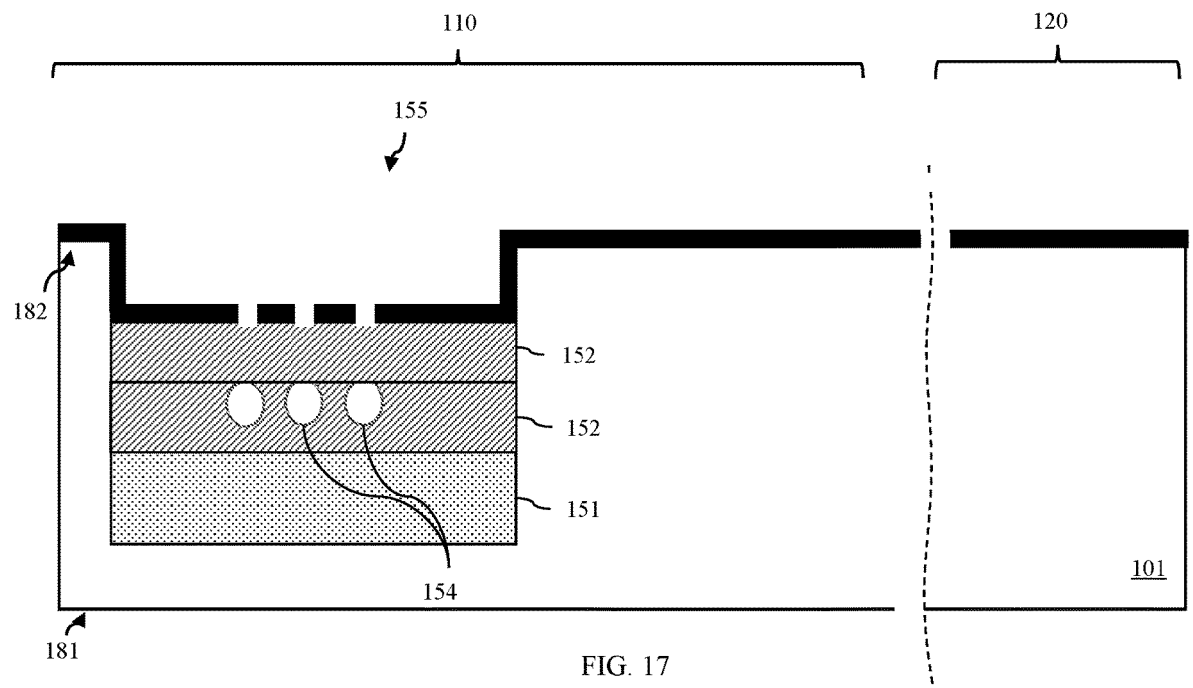
Figure 18:
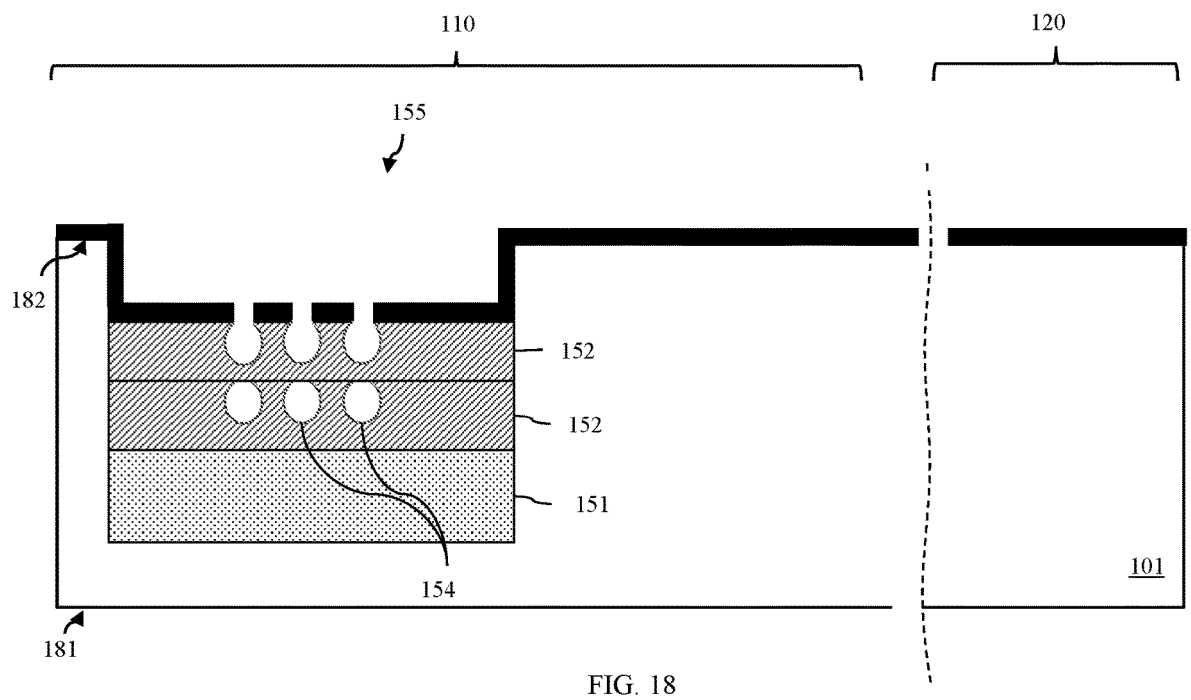
Figure 19:
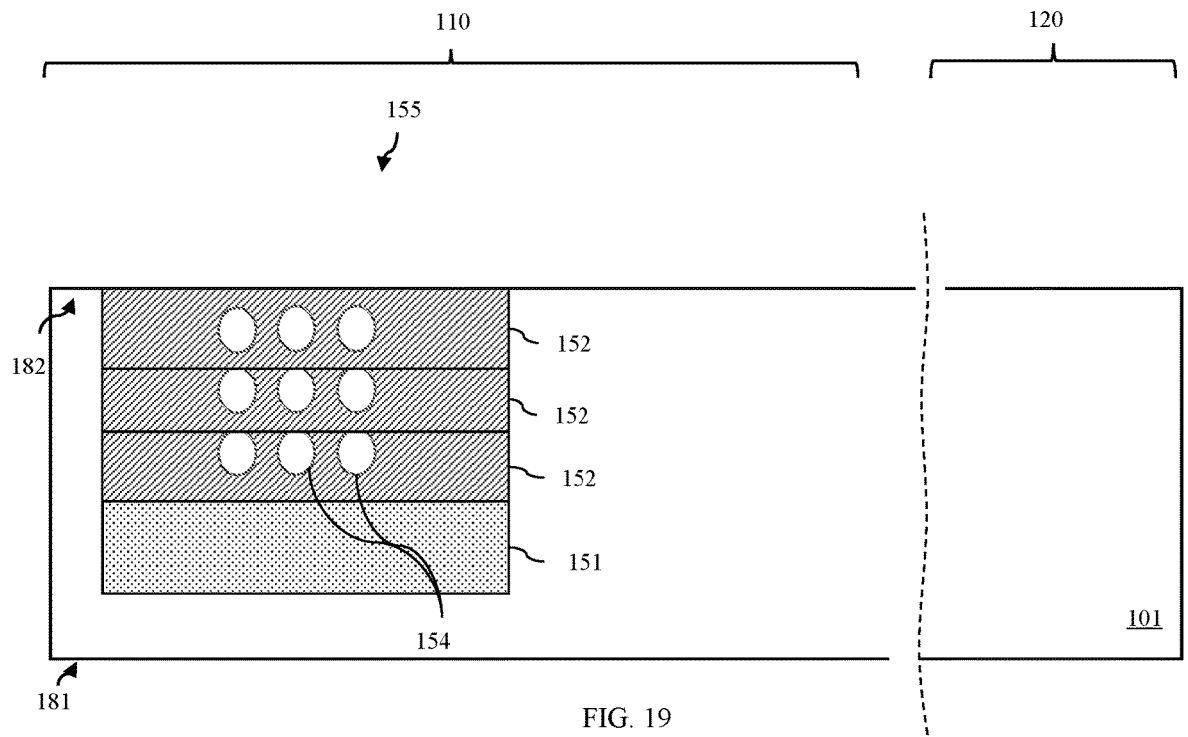

Formation of the waveguide 150 at process 706 can further include depositing an additional layer of the core material 152 to encapsulate the one or more cavities 154 in the layer of core material 152 below (see process 720 and FIG. 16). A polishing process (e.g., a conventional CMP process) can then be performed to remove any core material 152 from above the top surface 182 of the substrate 101. If only a single cavity or single row of cavities 154 is to be included in the core 158 of the waveguide 150, process 722 can be performed, as described below. If an additional cavity or cavities are to be included in the core 158, processes 716-720 can be repeated as necessary prior to process 722 (e.g., see FIGS. 17-19). See the discussion of FIGS. 6.1-6.7 regarding various cavity patterns that could be formed.

Figure 20:
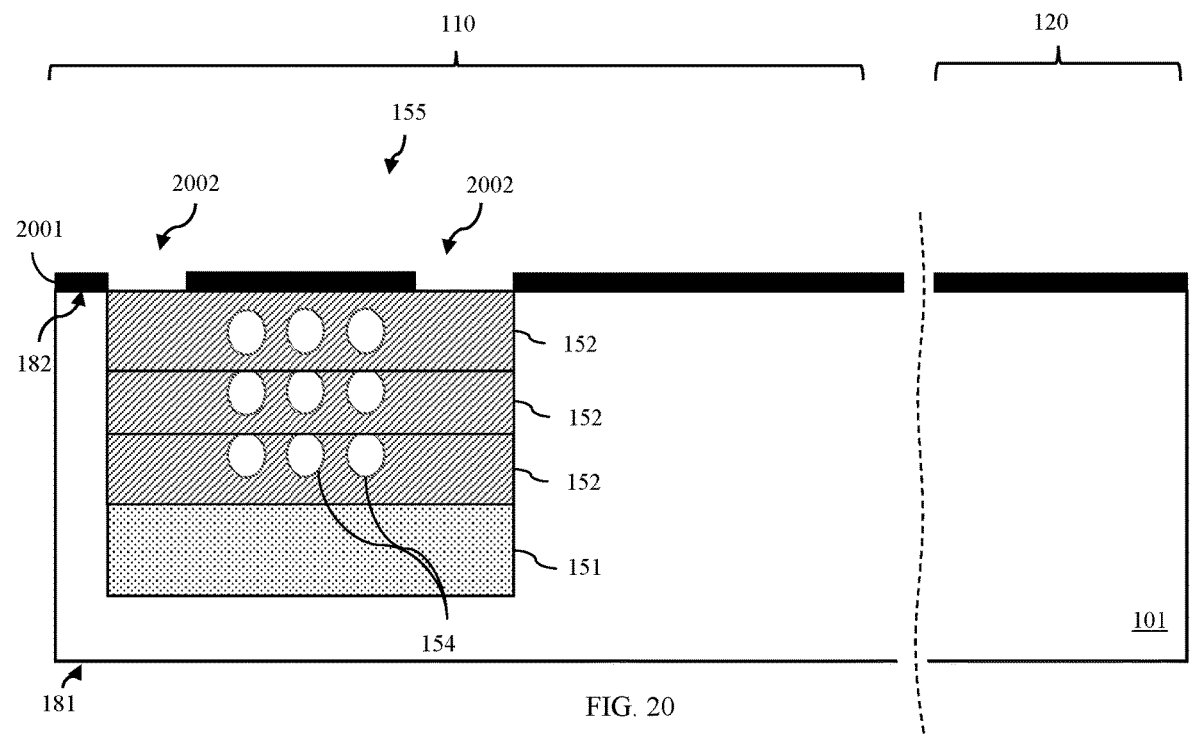
Figure 21:
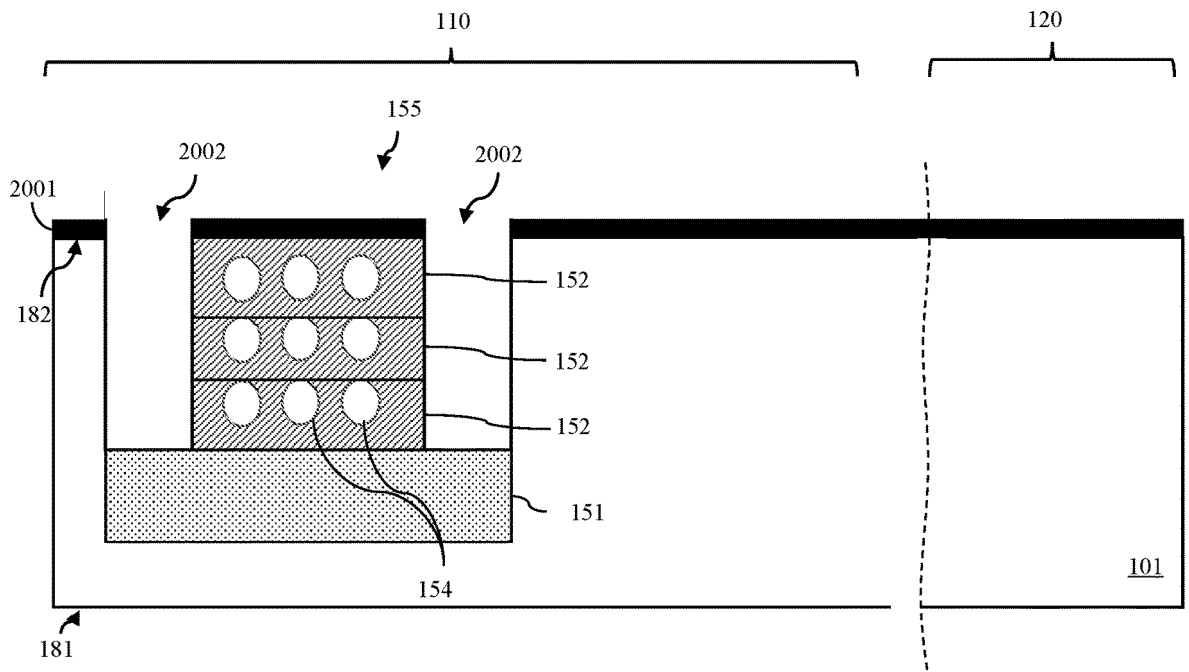
Figure 22:
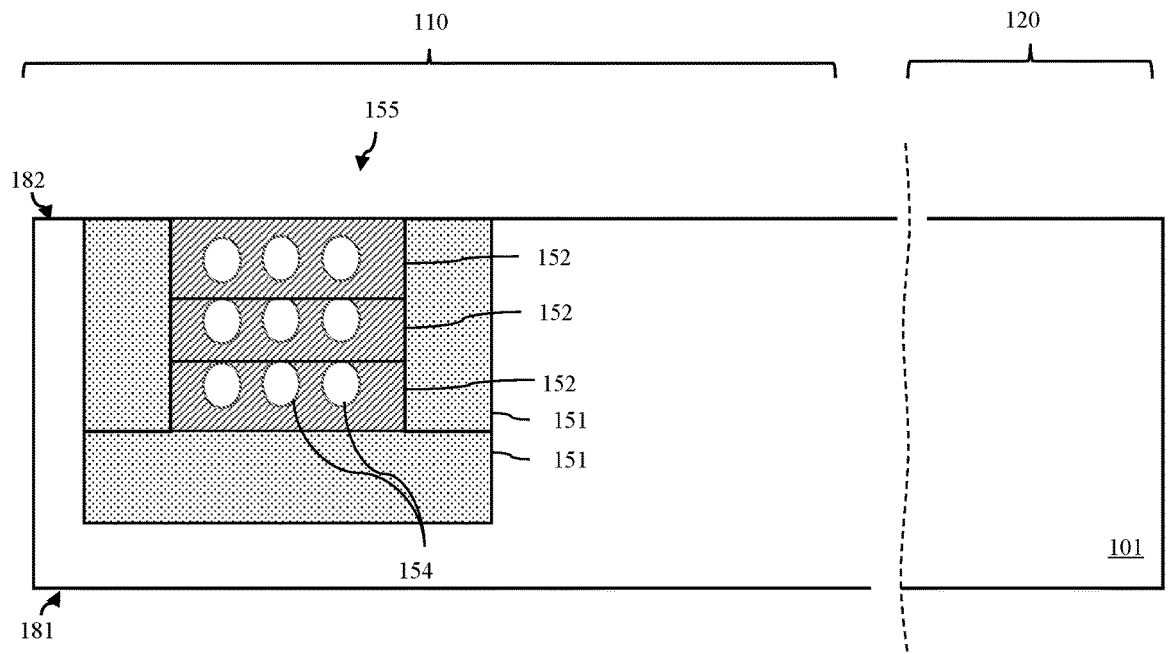

Formation of the waveguide 150 at process 706 can further include patterning the stacked layers of core material 152 (e.g., using conventional lithographic patterning and selective etch processes) within the trench 155 (see process 722 and FIGS. 20-22). For example, a conformal hardmask layer 2001 (e.g., a conformal SiN layer) can be formed over the partially completed structure and patterned with openings 2002 (see FIG. 20). The openings 2002 can be oriented in the same direction as the waveguide 150 along the opposing sidewalls of the trench 155 and, optionally, also at one or both end walls of the trench 155. Formation of the openings 2002 can be performed, for example, using conventional lithographic patterning and etch processes so that the openings 2002 expose corresponding section(s) of the core material 152 below. Next, a selective anisotropic etch process can be performed to etch the exposed sections of the core material 152, thereby defining the shape of the core 158 and exposing the sidewalls of the trench 155 and, optionally, one or both end walls of the trench 155 (see FIG. 21). Following process 722, the hardmask layer 2001 can be selectively removed.

Formation of the waveguide 150 at process 706 can further include depositing an additional layer of the cladding material 151 to completely fill the openings 2002 formed at process 722 (see process 724 and FIG. 22). Following deposition of the additional layer of cladding material 151, yet another polishing process (e.g., a conventional CMP process) can be performed in order to remove any cladding material 151 from above the top surface 182 of the substrate 101.

It should be noted that the width of the openings 2002 patterned at process 722 should correspond to the desired thickness ($t_{cladding}$) of the cladding material 151 to be wrapped around the core 158. It should further be noted that, although not shown, processes 722 and 724 described above can optionally be modified to form the waveguide 150 of the structure 100.5 shown in FIG. 5, where the core 158 is patterned into discrete elongated bodies of core material 152 separated by cladding material 151.

Figure 23:
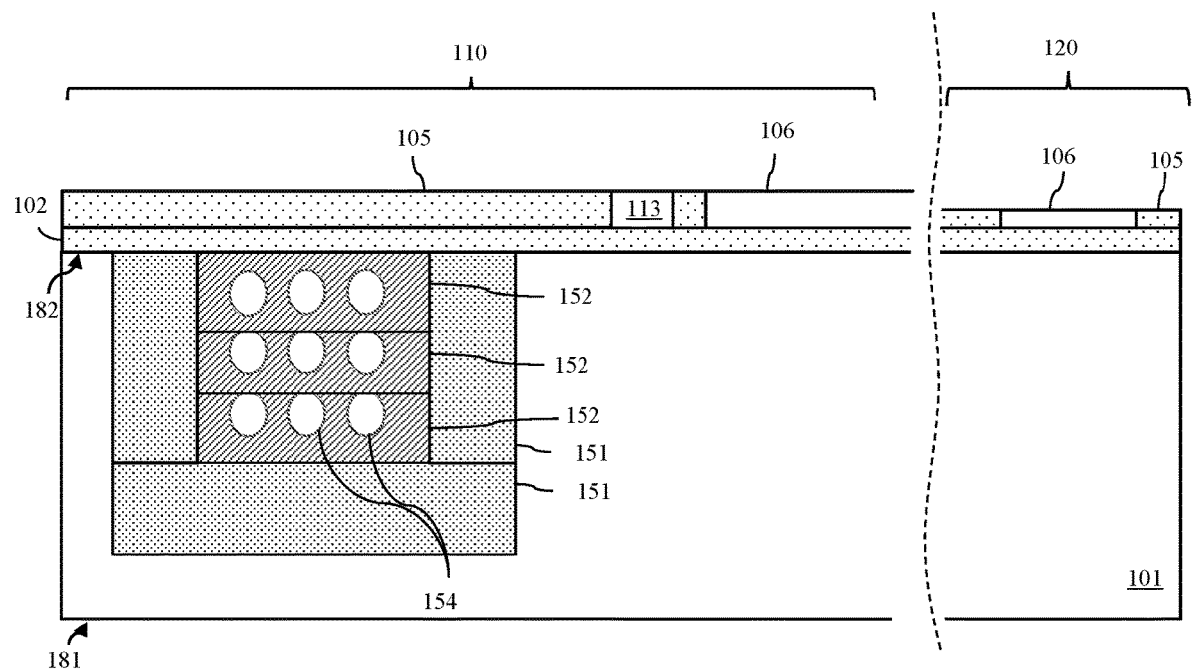

In any case, following formation of the waveguide 150 at process 706, the method can further include forming an insulator layer 102 on the top surface 182 of the substrate 101 such that it covers the waveguide 150 (see process step 728 and FIG. 23). This insulator layer 102 can be, for example, a silicon dioxide layer (also referred to herein as a buried oxide (BOX) layer).

The method can further include forming a semiconductor layer 106 on the insulator layer 102 (see process 730 and FIG. 23). The semiconductor layer 106 can be a monocrystalline semiconductor layer, such as a monocrystalline Si layer or a layer of some other suitable monocrystalline semiconductor material. Formation of the semiconductor layer 106 can be achieved, for example, using a conventional wafer bonding process. For example, an additional monocrystalline semiconductor substrate (e.g., an additional monocrystalline Si substrate) can be bonded to the top surface of the insulator layer 102 (e.g., using a smart cut or other suitable wafer bonding process). A polishing process (e.g., a conventional CMP process) can then be employed to reduce the height of the semiconductor layer 106 so that it has a desired thickness. As mentioned above with regard to the structure embodiments, in some embodiments, the semiconductor layer 106 can be thinner within the electronic device area 120 than it is within the optical device area 110. Various techniques are well known in the art for varying the thickness of a layer within one area as compared to another. For example, the optical device area 110 could be masked and the semiconductor layer 106 in the electronic device area 120 could be recessed. Alternatively, the electronic device area 120 could be masked, and additional semiconductor material can be epitaxially grown in the optical device area 110. Alternatively, any other suitable technique could be employed. Details of these techniques have been omitted form this specification in order to allow the reader to focus on the salient aspects of the disclosed methods.

The method can further include forming isolation regions, such as shallow trench isolation (STI) regions 105, within the semiconductor layer 106 (see process 732 and FIG. 23). For example, shallow trenches can be formed (e.g., using conventional lithographic patterning and etch techniques) such that they extend fully through the semiconductor layer 106 to the insulator layer 102. Each of these shallow trenches can be filled with one or more layers of isolation material. The isolation material of the STI regions 105 can be $SiO_2$ or any other suitable isolation material. Such STI regions 105 can be formed in the semiconductor layer 106 within and between the various device areas 110, 120 so that they define the boundaries of the device areas and so that they isolate devices, as necessary. One STI region 105 can specifically be formed within the semiconductor layer 106 in the optical device area 110 and aligned above the waveguide 150. This STI region 105 and the insulator layer 102 can provide additional cladding for the waveguide 150.

Figure 24:
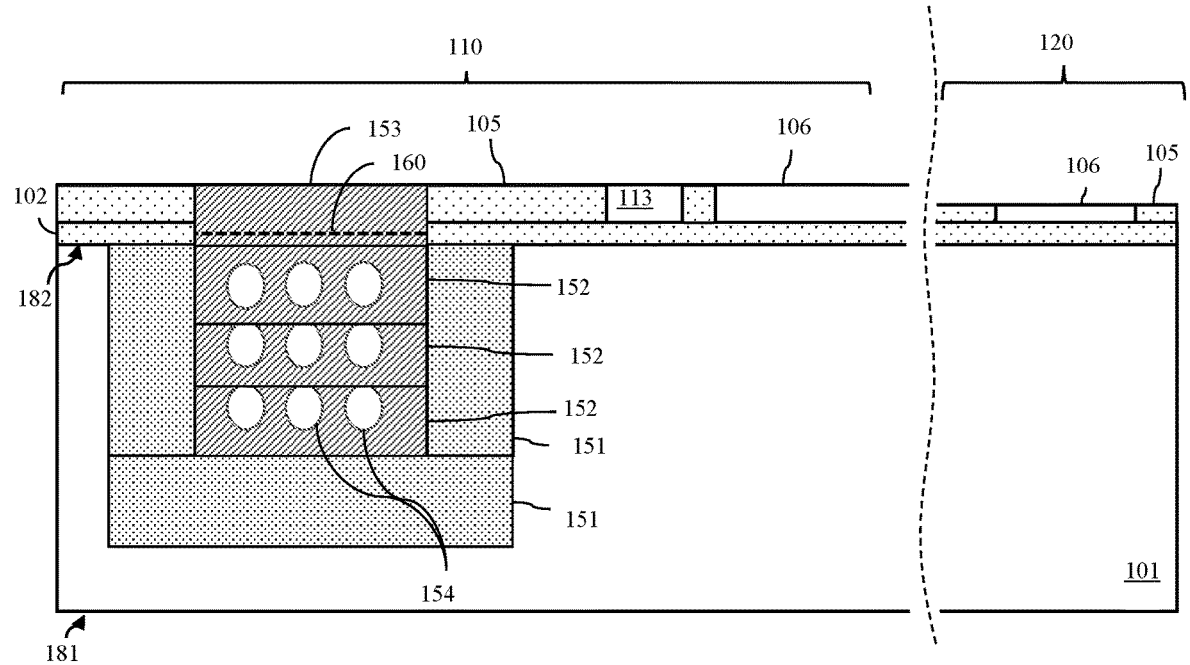

Optionally, the method can further include forming a waveguide extender 153 to enhance coupling between the waveguide 150 and an additional waveguide 114a that will subsequently be formed at process 736 discussed below (see process 734 and FIG. 24). Specifically, an opening can be formed (e.g., lithographically patterned and etched) such that it extends vertically through the STI region 105 and the insulator layer 102 and exposes the top of the core 158 of the waveguide 150. The opening can be filled, for example, with the same core material 152 as was used for the core 158 of the waveguide 150 or with the same core material that will be used for the core of the additional waveguide 114a, thereby forming the waveguide extender 153. Alternatively, the opening could extend only to some depth above the level of the core 158 (e.g., as indicated by line 160), but sufficiently close thereto to enable evanescent-wave coupling with the waveguide extender 153 formed therein.

The method can further include performing front-end-of-the-line (FEOL) processing to form any of one or more additional optical devices in the optical device area 110 and/or one or more electronic devices in the electronic device area 120 (see process 736 and FIGS. 1A-5). FEOL electronic devices that can be formed at process 736 can include, but are not limited to, active semiconductor devices and/or passive semiconductor devices. Active semiconductor devices can include, for example, complementary metal oxide semiconductor (CMOS) devices (e.g., one or more field effect transistors (FETs) 122, as illustrated) or any other suitable type of active semiconductor device. Passive semiconductor devices could include, resistors, capacitors, etc. FEOL optical devices that can be formed at process 736 can include, but are not limited to, optical devices in and/or formed using the semiconductor layer 106. Such devices can include, but are not limited to, any of the following: a semiconductor waveguide 113 with a core patterned from the semiconductor layer 106 (e.g., a Si waveguide with a Si core), a photodetector 112 (e.g., a germanium photodetector), an optical modulator, etc. Techniques for forming such FEOL electronic and optical devices are well known in the art and, thus, the details thereof have been omitted from this specification in order to allow the reader to focus on the salient aspects of the disclosed embodiments.

Optionally, process 736 can further include forming a relatively thin conformal etch stop layer 103 (e.g., a conformal SiN layer) over the partially completed structure. Then, one or more additional optical devices could be formed in the optical device area 110 above the etch stop layer 103. The additional optical devices above the etch stop layer 103 could include, for example, one or more additional waveguides 114a-114b. For example, an additional core material (e.g., SiN or some other suitable high refractive index core material, such as silicon carbon nitride (SiCN), silicon oxynitride (SiON), aluminum nitride (AlN), gallium nitride (GaN), or alumina (Al2O3)) could be deposited and then lithographically patterned and etched. Patterning of the additional core material can be performed so the additional waveguide 114a has an end aligned above and, particularly, overlaying the second end of the waveguide 150 and so that the additional waveguide 114b is offset from the waveguide 150. Alternatively, the additional waveguides 114a and 114b could be formed using discrete processing steps so that they comprise different core materials.

Additional processing can then be performed in order to complete the structure 100.1-100.5 (see process 738 and FIGS. 1A-5).

For example, process 738 can include MOL processing including deposition of one or more layers of interlayer dielectric (ILD) material 104 over the partially completed structure, followed by a polishing process (e.g., a conventional CMP process). The ILD material 104 can be, for example, doped silicon glass (e.g., phosphosilicate glass (PSG) or borophosphosilicate glass (BPSG)), silicon dioxide, or any other suitable ILD material. In any case, this ILD material 104 should have a relatively low refractive index (e.g., a refractive index of lower than 2.0) to allow it to be employed as cladding material for the additional waveguides 114a-114b. MOL processing can also include formation of MOL contacts extending through the ILD material 104 to one or more of the FEOL devices.

Process 738 can further include back end of the line (BEOL) processing. BEOL processing can include BEOL metal wiring. BEOL processing can also include V-shaped groove 159 formation in the substrate 101 adjacent to the first end of the waveguide 150 to enable coupling with an off-chip optical fiber 190. BEOL processing can further include wafer dicing and chip packaging. Such processes are well known in the art and, thus, the details thereof have been omitted from this specification in order to allow the reader to focus on the salient aspects of the disclosed embodiments. However, it should be noted that formation of the structure 100.3 of FIG. 3 can include, during chip packaging, filling the cavity or cavities 154 with a flowable material 301 (e.g., a gas or liquid) that has a relatively low refractive index and capping the cavity or cavities 154 with a cap 195 that does not prevent optical coupling between the waveguide 150 and the off-chip optical fiber 190. Additionally, although not shown, instead of filling the cavity or cavity 154 with a flowable material, during chip packaging, the cavity or cavities 154 could optionally be capped such that they are under vacuum.

It should be understood that in the structures and method described above, a semiconductor material refers to a material whose conducting properties can be altered by doping with an impurity. Such semiconductor materials include, for example, silicon-based semiconductor materials (e.g., silicon, silicon germanium, silicon germanium carbide, silicon carbide, etc.) and III-V compound semiconductors (i.e., compounds obtained by combining group III elements, such as aluminum (Al), gallium (Ga), or indium (In), with group V elements, such as nitrogen (N), phosphorous (P), arsenic (As) or antimony (Sb)) (e.g., GaN, InP, GaAs, or GaP). A pure semiconductor material and, more particularly, a semiconductor material that is not doped with an impurity for the purposes of increasing conductivity (i.e., an undoped semiconductor material) is referred to in the art as an intrinsic semiconductor. A semiconductor material that is doped with an impurity for the purposes of increasing conductivity (i.e., a doped semiconductor material) is referred to in the art as an extrinsic semiconductor and will be more conductive than an intrinsic semiconductor made of the same base material. That is, extrinsic silicon will be more conductive than intrinsic silicon; extrinsic silicon germanium will be more conductive than intrinsic silicon germanium; and so on. Furthermore, it should be understood that different impurities (i.e., different dopants) can be used to achieve different conductivity types (e.g., P-type conductivity and N-type conductivity) and that the dopants may vary depending upon the different semiconductor materials used. For example, a silicon-based semiconductor material (e.g., silicon, silicon germanium, etc.) is typically doped with a Group III dopant, such as boron (B) or indium (In), to achieve P-type conductivity, whereas a silicon-based semiconductor material is typically doped a Group V dopant, such as arsenic (As), phosphorous (P) or antimony (Sb), to achieve N-type conductivity. A gallium nitride (GaN)-based semiconductor material is typically doped with magnesium (Mg) to achieve P-type conductivity and with silicon (Si) or oxygen to achieve N-type conductivity. Those skilled in the art will also recognize that different conductivity levels will depend upon the relative concentration levels of the dopant(s) in a given semiconductor region. Furthermore, when a semiconductor region or layer is described as being at a higher conductivity level than another semiconductor region or layer, it is more conductive (less resistive) than the other semiconductor region or layer; whereas, when a semiconductor region or layer is described as being at a lower conductivity level than another semiconductor region or layer, it is less conductive (more resistive) than that other semiconductor region or layer.

It should further be understood that the terminology used herein is for the purpose of describing the disclosed structures and methods and is not intended to be limiting. For example, as used herein, the singular forms "a," "an" and "the" are intended to include the plural forms as well, unless the context clearly indicates otherwise. Additionally, as used herein, the terms "comprises," "comprising," "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right," "left," "vertical," "horizontal," "top," "bottom," "upper," "lower," "under," "below," "underlying," "over," "overlying," "parallel," "perpendicular," etc., are intended to describe relative locations as they are oriented and illustrated in the drawings (unless otherwise indicated) and terms such as "touching," "in direct contact," "abutting," "directly adjacent to," "immediately adjacent to," etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various disclosed embodiments have been presented for purposes of illustration but are not intended to be exhaustive or limiting. Many modifications and variations will be apparent to those of ordinary skill in the art without departing from the scope and spirit of the disclosed embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
    a semiconductor substrate;
    a waveguide in a trench in the semiconductor substrate and including:
        cladding material lining the trench;
        a core within the trench on the cladding material, wherein the core has a first end and a second end opposite the first end; and
        multiple cavities within the core, wherein each of the multiple cavities is elongated and extends linearly from the first end toward the second end; and
    an insulator layer on the semiconductor substrate and extending laterally over the trench, wherein the insulator layer is immediately adjacent to the cladding material and the core.

2. The structure of claim 1, wherein the core includes an elongated body of a core material, wherein the core has a first length from the first end to the second end, and wherein the multiple cavities have a second length that is at least half the first length.

3. The structure of claim 1,
wherein the core includes different layers of core material, and
wherein at least some of the multiple cavities are stacked vertically, physically separated, and contained within different layers of the core material.

4. The structure of claim 1,
wherein the core includes different layers of the core material,
and
wherein at least some of the multiple cavities are laterally adjacent, physically separated, and contained within a same layer of the core material.

5. The structure of claim 1, wherein a pattern of the multiple cavities includes any of:
an array of the multiple cavities arranged in columns and rows;
a column of the multiple cavities;
a row of the multiple cavities;
an oval pattern of the multiple cavities;
a polygon pattern of the multiple cavities; and
a random pattern of the multiple cavities.

6. The structure of claim 1, wherein the core includes multiple parallel sections physically separated by the cladding material.

7. The structure of claim 1,
wherein the cladding material has a first refractive index, and
wherein the core includes core material having a second refractive index that is greater than the first refractive index.

8. The structure of claim 1, wherein each cavity is one of under vacuum and at least partially filled with an additional material.

9. The structure of claim 1, further comprising:
a semiconductor layer on the insulator layer;
an isolation region extending through the semiconductor layer and aligned above the waveguide; and
an additional waveguide on the isolation region aligned above the waveguide.

10. A structure comprising:
a semiconductor substrate;
a waveguide in a trench in the semiconductor substrate and including:
cladding material lining the trench;
a core within the trench on the cladding material; and
at least one cavity within the core;
an insulator layer on the semiconductor substrate and extending laterally over the waveguide;
a semiconductor layer on the insulator layer;
an isolation region extending through the semiconductor layer to the insulator layer and aligned above the waveguide;
a waveguide extender extending at least partially through the isolation region and the insulator layer toward the waveguide; and
an additional waveguide on the waveguide extender.

11. The structure of claim 10, wherein the core includes an elongated body of a core material and has a first end and a second end opposite the first end and wherein each cavity includes an elongated cavity within the core material extending from the first end toward the second end.

12. The structure of claim 10,
wherein the core includes different layers of core material,
wherein the structure further includes multiple cavities contained within the core, and
wherein at least some of the multiple cavities are stacked vertically, physically separated, and contained within different layers of the core material.

13. The structure of claim 10,
wherein the core includes different layers of core material,
wherein the structure further comprising multiple cavities contained within the core, and
wherein at least some of the multiple cavities are laterally adjacent, physically separated, and contained with a same layer of the core material.

14. The structure of claim 10,
wherein the cladding material has a first refractive index,
wherein the core includes core material with a second refractive index that is greater than the first refractive index, and
wherein the at least one cavity is one of under vacuum and at least partially filled with an additional material that is different from the cladding material and the core material.

15. A method comprising:
providing a semiconductor substrate;
forming a trench in the semiconductor substrate;
forming a waveguide in the trench, wherein the waveguide includes:
cladding material lining the trench;
a core within the trench on the cladding material, wherein the core has a first end and a second end opposite the first end; and
multiple cavities within the core, wherein each of the multiple cavities is elongated and extends linearly from the first end toward the second end; and
forming an insulator layer on the semiconductor substrate and extending laterally over the trench, wherein the insulator layer is immediately adjacent to the cladding material and the core.

16. The method of claim 15, wherein the forming of the waveguide includes:
forming a first layer of the cladding material;
recessing the first layer of the cladding material, wherein the recessing exposes sidewalls of the trench and leaves a bottom of the trench covered by the cladding material;
filling the trench with a first layer of core material;
recessing the first layer of the core material;
forming at least one first cavity in the first layer of the core material; and
forming a second layer of the core material on the first layer of the core material over the at least one first cavity.

17. The method of claim 16, wherein the forming of the waveguide further includes:
recessing the second layer of the core material;
forming at least one second cavity within the second layer of the core material; and
forming at least one third layer of the core material on the second layer of the core material over the at least one second cavity.

18. The method of claim 16, wherein the forming of the waveguide further includes:
after the multiple cavities are formed within the core material of the core, patterning the core material with openings that expose the sidewalls of the trench and opposing sidewalls of the core, wherein the core comprises an elongated body of the core material and has a first end and a second end opposite the first end and wherein each cavity comprises an elongated cavity within the core material extending from the first end toward the second end; and forming a second layer of the cladding material in the openings and positioned laterally immediately adjacent to the opposing sidewalls of the core.

19. The method of claim 15, further comprising:
forming a semiconductor layer on the insulator layer;
forming an isolation region extending through semiconductor layer and aligned above the waveguide; and
forming an additional waveguide aligned above the waveguide.

20. The method of claim 19, further comprising forming a waveguide extender extending at least partially through the isolation region and the insulator layer toward the waveguide, wherein the additional waveguide is formed on the waveguide extender.

* * * * *